United States Patent
Tørudbakken et al.

(10) Patent No.: US 7,620,741 B2
(45) Date of Patent: Nov. 17, 2009

(54) PROXY-BASED DEVICE SHARING

(75) Inventors: Ola Tørudbakken, Oslo (NO); Bjørn Dag Johnsen, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 296 days.

(21) Appl. No.: 11/291,313

(22) Filed: Dec. 1, 2005

(65) Prior Publication Data

US 2006/0242330 A1 Oct. 26, 2006

Related U.S. Application Data

(60) Provisional application No. 60/674,059, filed on Apr. 22, 2005.

(51) Int. Cl.
G06F 3/00 (2006.01)
G06F 13/14 (2006.01)
G06F 13/36 (2006.01)
G06F 13/20 (2006.01)
G06F 15/177 (2006.01)

(52) U.S. Cl. .............. 710/2; 710/305; 710/306; 710/311; 710/312; 710/313; 710/317; 709/220; 709/221; 709/222

(58) Field of Classification Search .............. 710/2, 710/305, 306, 311, 312, 313, 317; 709/220–222
See application file for complete search history.

(56) References Cited

U.S. PATENT DOCUMENTS

| | | | |
|---|---|---|---|
| 5,455,814 A | 10/1995 | Sako | |
| 6,496,880 B1 * | 12/2002 | Ma et al. | 710/38 |
| 6,598,144 B1 | 7/2003 | Bailey | |
| 6,742,075 B1 | 5/2004 | Bailey | |
| 7,010,607 B1 | 3/2006 | Bunton | |
| 7,024,570 B2 | 4/2006 | Hoehler | |
| 7,043,541 B1 | 5/2006 | Bechtolsheim | |
| 7,130,958 B2 | 10/2006 | Chou | |
| 7,143,227 B2 | 11/2006 | Maine | |
| 7,213,178 B1 | 5/2007 | Prasad | |
| 7,272,605 B1 | 9/2007 | Hinshaw | |
| 7,457,897 B1 | 11/2008 | Lee | |
| 2002/0059470 A1 | 5/2002 | Allard | |
| 2004/0230735 A1 | 11/2004 | Moll | |
| 2004/0268015 A1 | 12/2004 | Pettey | |
| 2005/0025119 A1 | 2/2005 | Pettey | |
| 2005/0034045 A1 | 2/2005 | Lueck | |
| 2005/0053060 A1 * | 3/2005 | Pettey | 370/385 |
| 2005/0102437 A1 | 5/2005 | Pettey | |
| 2005/0135397 A1 | 6/2005 | Hoban | |
| 2005/0188105 A1 | 8/2005 | Reinhard | |
| 2005/0190536 A1 | 9/2005 | Anderson | |
| 2005/0270988 A1 | 12/2005 | DeHaemer | |

(Continued)

OTHER PUBLICATIONS

Ravi Budruk, Don Anderson, Tom Shanley: "PCI Express System Architecture", 2004, pp. 729-730, Mindshare, XP002398437, ISBN :0-321-15630-7.

*Primary Examiner*—Niketa I Patel
(74) *Attorney, Agent, or Firm*—Park, Vaughan & Fleming, LLP

(57) ABSTRACT

A method is provided for supporting device sharing between hosts via a bus fabric. A master host owns a device tree and provides IO services to at least one client host. The client host comprises generic device drivers and subscribes to IO services provided by the master host.

12 Claims, 23 Drawing Sheets

U.S. PATENT DOCUMENTS

| | | |
|---|---|---|
| 2006/0004795 A1 | 1/2006 | Shah |
| 2006/0090116 A1 | 4/2006 | Gallagher |
| 2006/0114892 A1 | 6/2006 | Han |
| 2006/0173831 A1* | 8/2006 | Basso et al. .................. 707/3 |
| 2006/0187907 A1 | 8/2006 | Kinsman |
| 2006/0195759 A1 | 8/2006 | Bower |
| 2006/0206655 A1 | 9/2006 | Chappell |
| 2006/0251085 A1 | 11/2006 | Kalkunte |
| 2006/0259656 A1 | 11/2006 | Sullivan |
| 2006/0271823 A1 | 11/2006 | Smith |
| 2007/0186130 A1 | 8/2007 | Holm |
| 2007/0195761 A1 | 8/2007 | Tatar |

* cited by examiner

| | | Byte Offset (Hex) |
|---|---|---|
| Device ID | Vendor ID | 00 |
| Status | Command | 04 |
| Class Code | Revision ID | 08 |
| BIST | Header Type | Master Latency Timer | Cache Line Size | 0C |
| Base Address Register 0 | | 10 |
| Base Address Register 1 | | 14 |
| Secondary Latency Timer | Subordinate Bus Number | Secondary Bus Timer | Primary Bus Timer | 18 |
| Secondary Status | I/O Limit | I/O Base | 1C |
| Memory Limit | Memory Base | 20 |
| Prefetchable Memory Limit | Prefetchable Memory Base | 24 |
| Prefetchable Base Upper 32 Bits | | 28 |
| Prefetchable Base Lower 32 Bits | | 2C |
| I/O Limit Upper 16 Bits | I/O Limit Lower 16 Bits | 30 |
| Reserved | Capabilites Pointer | 34 |
| Expansion ROM Base Address | | 38 |
| Bridge Control | Interrupt Pin | Interrupt Line | 3C |

Fig. 6

| Byte Offset (Hex) | | |
|---|---|---|
| 31 Device ID | 0 Vendor ID | 00 |
| Status | Command | 04 |
| Class Code | Revision ID | 08 |
| BIST \| Header Type \| Master Latency Timer | Cache Line Size | 0C |
| Base Address Registers | | 10 |
| | | 14 |
| | | 18 |
| | | 1C |
| | | 20 |
| | | 24 |
| Cardbus CIS Pointer | | 28 |
| Subsystem ID | Subsystem Vendor ID | 2C |
| Expansion ROM Base Address | | 30 |
| Reserved | Capabilites Pointer | 34 |
| Reserved | | 38 |
| Max_Lat \| Min_Gnt \| Interrupt Pin | Interrupt Line | 3C |

Fig. 7

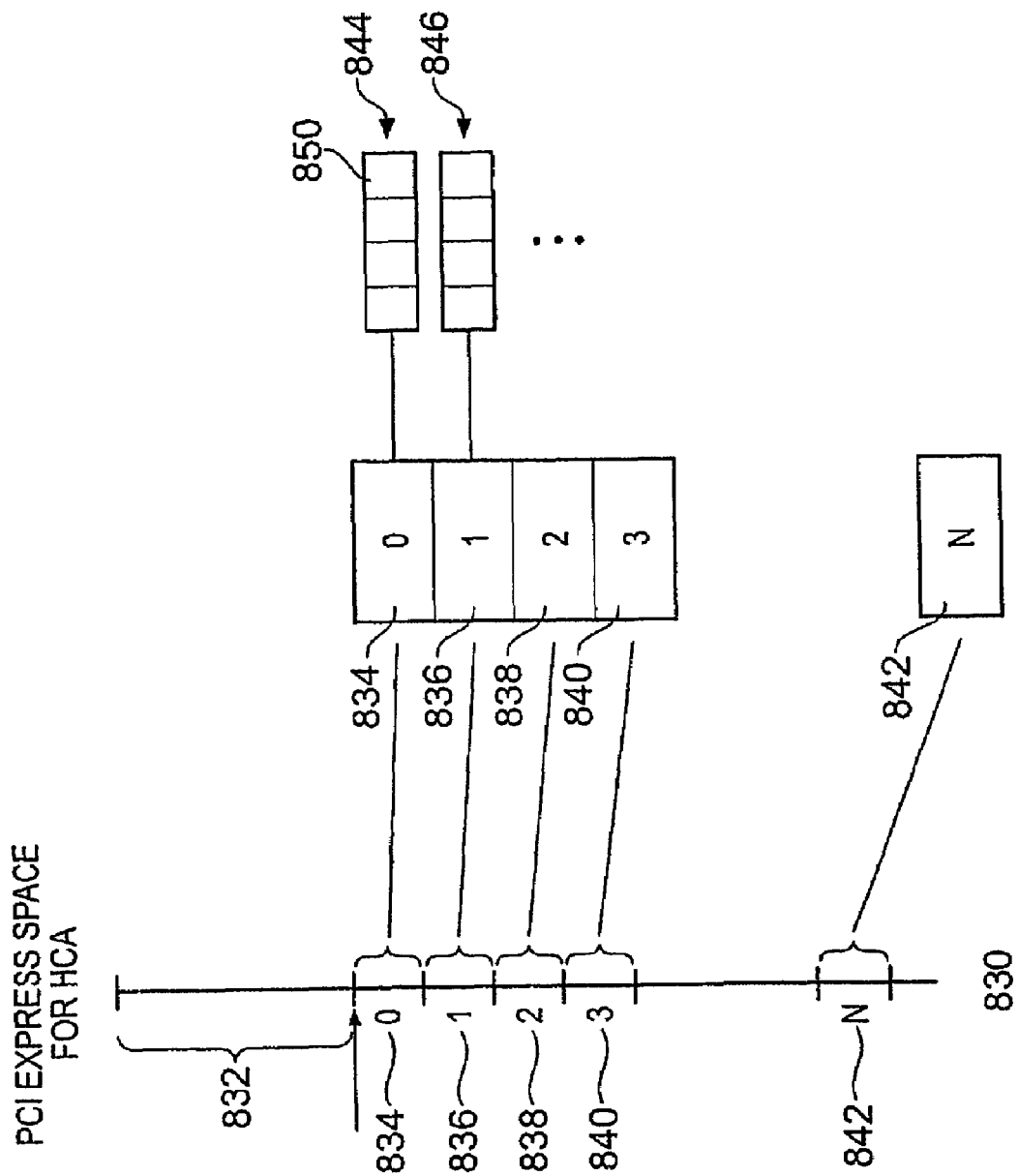

PROXY-BASED DEVICE SHARING

RELATED APPLICATIONS

This application claims priority to U.S. Provisional Application No. 60/674,059, which was filed Apr. 22, 2005 and is incorporated herein by reference. This application is related to U.S. patent application Ser. Nos. 11/291,314, entitled "Device Sharing", 11/291,264, entitled "Virtualization for Device Sharing", 11/291,263 entitled "Scalable Routing and Addressing", 11/291,279 entitled "Flexible Routing and Addressing", 11/291,361, entitled "Distributed I/O Bridging Functionality" and 11/291,359, entitled "Adding Packet Routing Information Without ECRC Recalculation", all of which were filed Dec. 1, 2005.

BACKGROUND

The present invention relates to communication apparatus and in particular, but not exclusively, to a PCI-Express interconnect apparatus.

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU<->I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

SUMMARY OF THE INVENTION

The present invention has been made, at least in part, in consideration of problems and drawbacks of conventional systems.

An embodiment of the invention provides a method for supporting device sharing between hosts via a bus fabric. A master host owns a device tree including at least one device and provides I/O services to at least one client host for accessing the device. The client host comprises generic device drivers and subscribes to the I/O services provided by the master host to access the device.

In an embodiment of the invention, a client host is unable to access a device directly, but instead accesses the device via the master host.

An embodiment of the invention thus provides proxy-based device sharing.

Although specific combinations of features are identified in the independent and dependent claims, it will be appreciated that embodiments of the invention may include combinations of the features of the independent and dependent claims other than those specifically identified by the dependencies of the accompanying claims.

BRIEF DESCRIPTION OF THE FIGURES

Specific embodiments of the present invention will now be described by way of example only with reference to the accompanying Figures in which:

FIG. 6 is a schematic structure overview for a Type 1 configuration header;

FIG. 7 is a schematic structure overview for a Type 0 configuration header;

FIG. 25 is a schematic block diagram illustrating a PCI Express address mapping for a host channel adapter.

Figure 1:
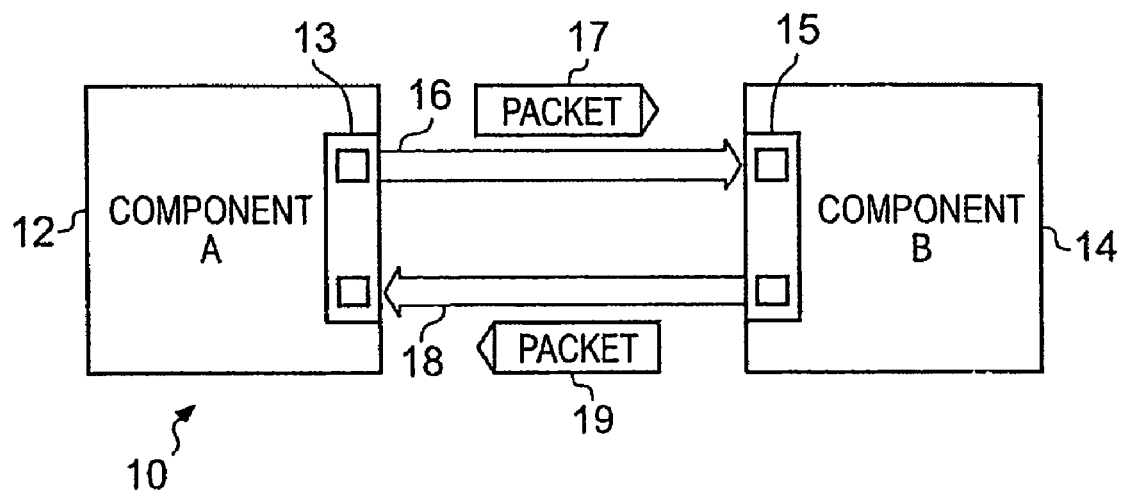
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

One computer interconnect standard is the PCI Express 1.0 standard set out in the PCI Express Base Specification 1.0 available from the PCI (Peripheral Component Interconnect) Special Interest Group (www.pcisig.com). The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are Power Management, Quality of Service (QoS), Hot-Plug/Hot-Swap support, Data Integrity and Error Handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
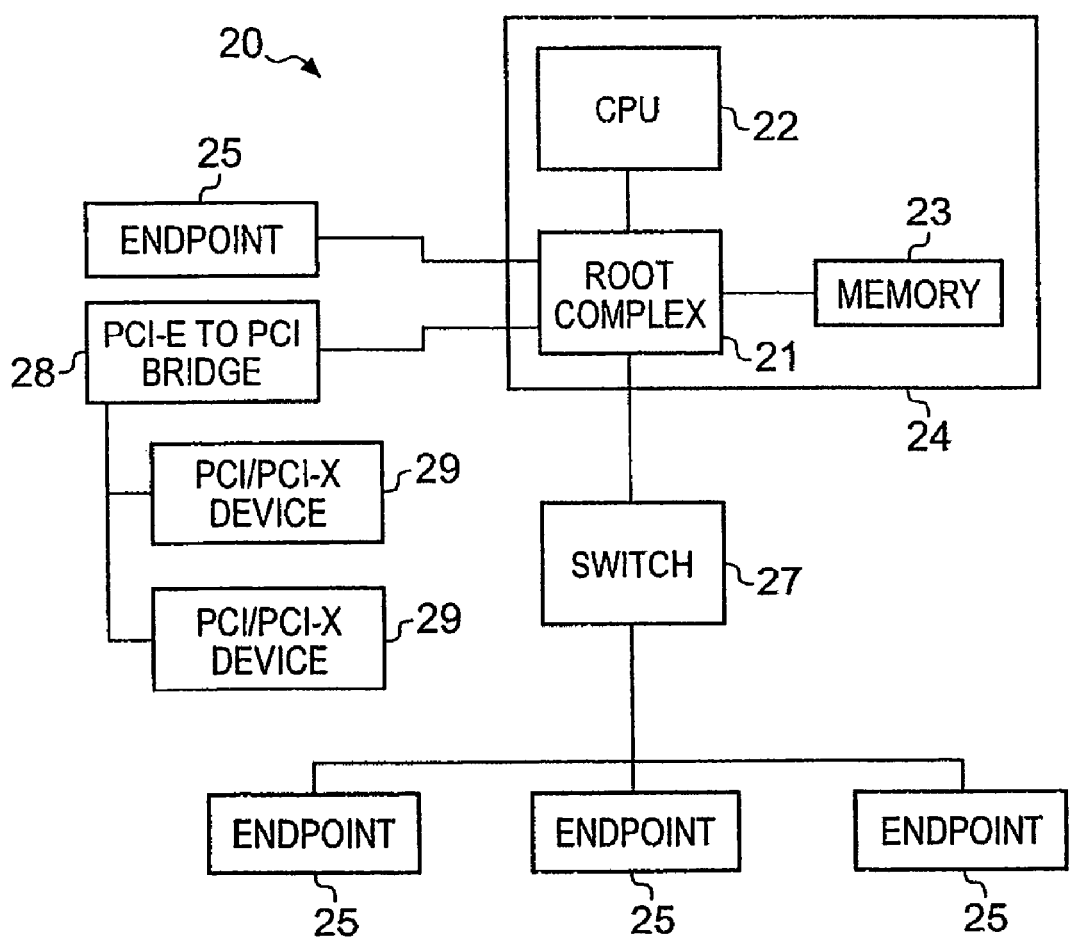
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express Links. The root complex 21 can be connected to a CPU 22 and memory 23 subsystem which requires access to the I/O facilitated by the PCI Express Fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or host CPU). Examples of endpoints include: a PCI Express attached graphics controller, a PCI Express-USB host controller, and a PCI Express attached network interface such as an Ethernet MAC/PHY or Infini-Band Host Channel Adapter (HCA).

Figure 3:
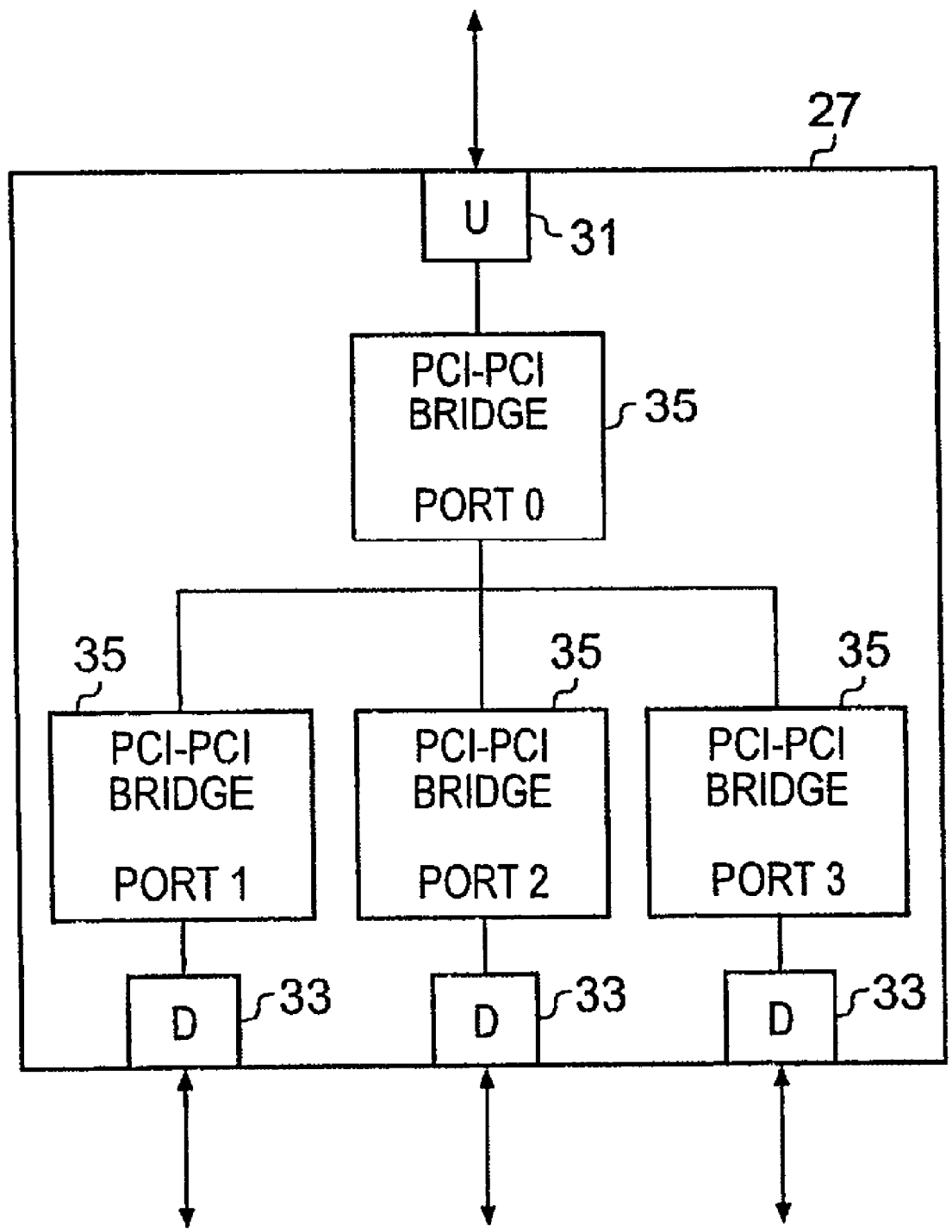
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express Bridges and forward transactions using PCI Bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge. A switch such as switch 27 can be configured as one or more integrated circuits, for example as one or more Application Specific Integrated Circuits (ASICs).

A PCI Express to PCI Bridge 28 (FIG. 2) provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express Link is mapped through a virtual PCI-to-PCI Bridge structure and has a logical PCI bus associated with it. The virtual PCI-to-PCI Bridge structure may be part of a PCI Express Root Complex Port, a Switch Upstream Port, or a Switch Downstream Port. A Root Port is a virtual PCI-to-PCI Bridge structure that originates a PCI Express hierarchy domain from a PCI Express Root Complex. Logical devices are mapped into configuration space such that each will respond to a particular device number.

Figure 4:
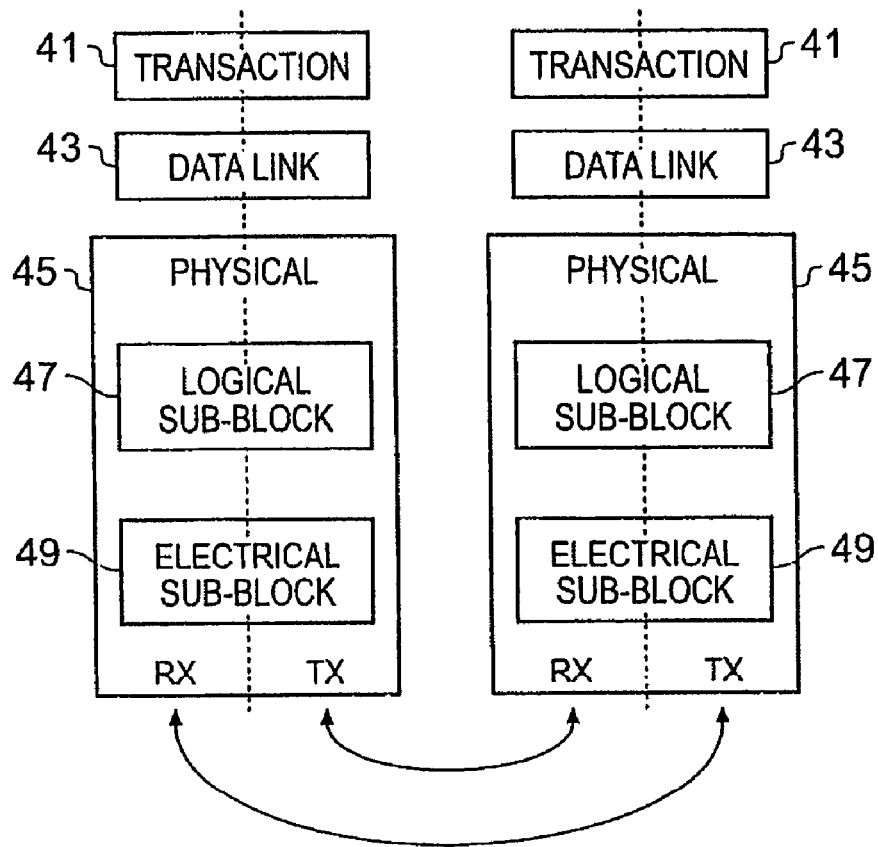
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets pass from their physical layer representation to the data link layer representation and finally (for transaction layer packets) to the form that can be processed by the transaction layer of the receiving device.

Figure 5:
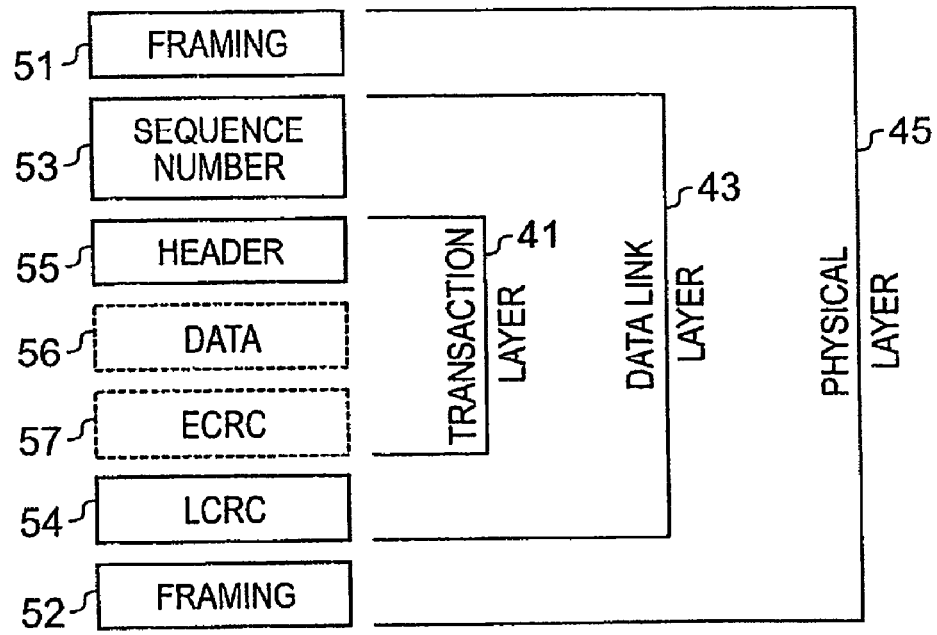
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same Link) for the purpose of Link management.

The upper Layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The Packets may also have attributes such as No Snoop and Relaxed Ordering.

The transaction Layer supports four address spaces: the three PCI address spaces (memory, I/O, and configuration) and a Message Space. According to the PCI Express specification, the Message Space is used to support all prior sideband signals, such as interrupts, power-management requests, and so on, as in-band Message transactions. PCI Express Message transactions can be considered as "virtual wires" since their effect is to eliminate the wide array of sideband signals used in a conventional platform implementation.

The middle Layer in the stack, the data link layer 43, serves as an intermediate stage between the transaction layer 41 and the physical layer 45. The primary responsibilities of the data link layer 41 include Link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the Link. The receiving data link layer 43 is responsible for checking the integrity of received TLPs and for submitting them to the transaction layer 41 for further processing. On detection of TLP error(s), this Layer is responsible for requesting retransmission of TLPs until information is correctly received, or the Link is determined to have failed.

The data link layer 43 also generates and consumes packets that are used for Link management functions. To differentiate these packets from those (TLP) used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This Layer is responsible for converting information received from the data link layer 43 into an appropriate serialized format and transmitting it across the PCI Express Link at a frequency and width compatible with the device connected to the other side of the Link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPS, exchanges Flow Control information with its complementary transaction layer 41 on the other side of the Link. It is also responsible for supporting both software and hardware-initiated power management.

Initialization and configuration functions require the transaction layer 41 to store Link configuration information generated by the processor or management device and store Link capabilities generated by physical layer hardware negotiation of width and operational frequency.

A transaction layer's packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the Link. Transaction credit status is periodically transmitted to the remote transaction layer using transport services of the data link layer. Remote Flow Control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide a means to support multiple independent logical data flows over given common physical resources of the Link. Conceptually this involves multiplexing different data flows onto a single physical Link. The Traffic Class is a transaction layer packet label that is transmitted unmodified end-to-end through the fabric. At every service point (e.g., Switch) within the fabric, Traffic Class labels are used to apply appropriate servicing policies. Each Traffic Class label defines a unique ordering domain—no ordering guarantees are provided for packets that contain different Traffic Class labels.

The data link layer 43 is responsible for reliably exchanging information with its counterpart on the opposite side of the Link. Accordingly, it has responsibility for initialization and power management services to: accept power state requests from the transaction layer 41 and convey them to the physical layer 45; and to convey active/reset/disconnected/power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >x1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the Link; and Link status information.

The data link to physical interface provides: byte or multi-byte wide data to be sent across the link (including a data transfer handshake mechanism and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, a PCI Express switch provides a single upstream port and one or more downstream ports. Configuration of the ports can be carried out using the PCI Express Configuration Space Headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P)). Each P2P bridge is identified through the Class Code register in the Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (bus device function) number. Each transaction layer packet which is transferred over the fabric includes a Requester ID field which is equal to the BDF of the requester of a transaction. In some cases, the packet may also include a Completer ID, which is the BDF of the completer of the transaction. The value of the Type 0/1 headers may be transmitted as payload to a transaction layer packet request or completion. The BDF is a 16-bit field composed of a Bus Number (8-bit, BN), a Device Number (5-bit, DN) and a Function Number (3-bit, FN). After the bus-walk is complete, the system platform performs bus enumeration by conducting a series of configuration write requests which include values which reflect the Type 0/1 headers within the payload to each device in the PCI Express hierarchy. This process assigns each device with a unique Bus Number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the Configuration Requests used by the host platform/root complex to enumerate the bus contain the values of the Type 1 header in their payload fields. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (Status and Command, which is the Command and Status Register (CSR) that provides status and control over the PCI Express interface). The Class Code field is used to define the type of device, as indicated above the P2P bridge is identified by a class code of 0x060400. The Type 1 header also has fields to identify the primary and secondary bus numbers of the P2P, and fields for BARs (Base Address Register) and Base/Limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of BN=virtual PCI Bus (2 in FIG. 3), DN=actual port/device, FN=0.

Also, respective ports may have respective secondary bus numbers, e.g. PORT 1 may have secondary bus number 3 (00000011), PORT 2 may have secondary bus number 4 (00000100), and PORT 3 may have secondary bus number 5

(00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (defined by a Base Address Register, or BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the BAR of PORT 3 may have a base of x0400 and a limit of x04FF. Thus the BAR of PORT 0 must a have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

Figure 8:
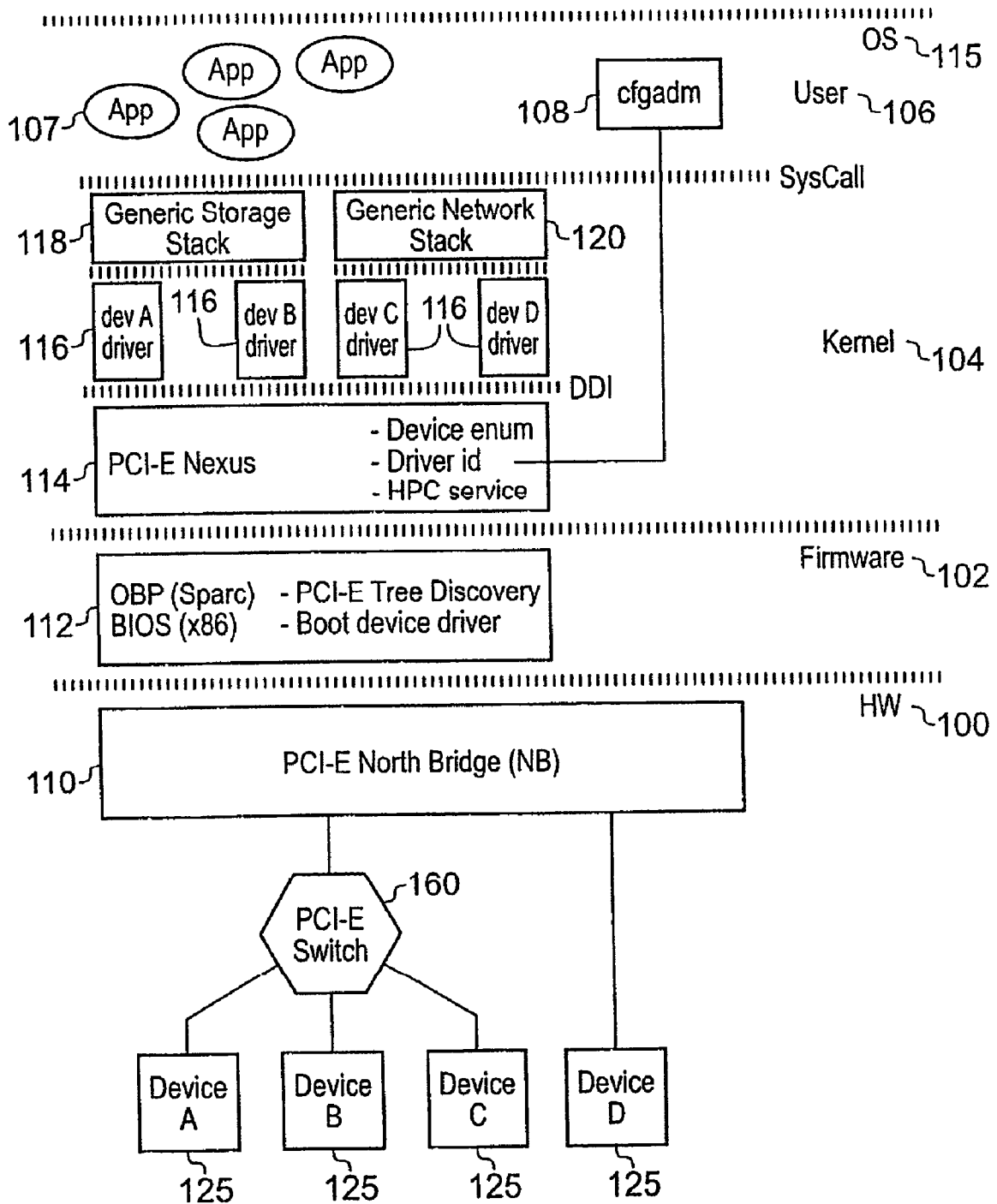
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver Interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows™ OS, a Linux™ OS, etc.

Although FIG. 8 only shows a single host, an example embodiment of the present invention is able to provide device sharing between multiple hosts.

In the following, with reference to FIGS. 9 to 16, there will now be described examples of an interconnect apparatus that is able to support device sharing, for example a PCI Express switch operable to support device sharing between multiple hosts. In some examples, the switch can be operable to be fully compatible with the existing PCI device programming model as seen from a host, OS, and device driver. In some examples, the fabric definition to support a multi-host shared device can be an extension of the existing PCI Express switch model. In some examples, the fabric definition to support a multi-host shared device can be backwards compliant to legacy devices and legacy switches at its endpoints. In some examples, the interoperability of a virtualized switch with designs based on the existing PCI Express packet format and wire protocols can be maximized. In some examples, the existing I/O software framework can be used unmodified with a virtualized switch and a multi-host shared device.

Although multi-host shared I/O can be generally of interest to multi-host systems, it is of particular interest to blade systems, both driven by cost and the ability to deliver services out of a "stateless blade" from the service identity point of view. In such an environment, around 8 to 16 host blades might wish to share a few I/O devices (for example a 10GBE NIC, a Fiberchannel (FC) HBA, and an IB HCA) and each fabric (redundant pair) can be a monolithic single stage fabric.

Figure 9:
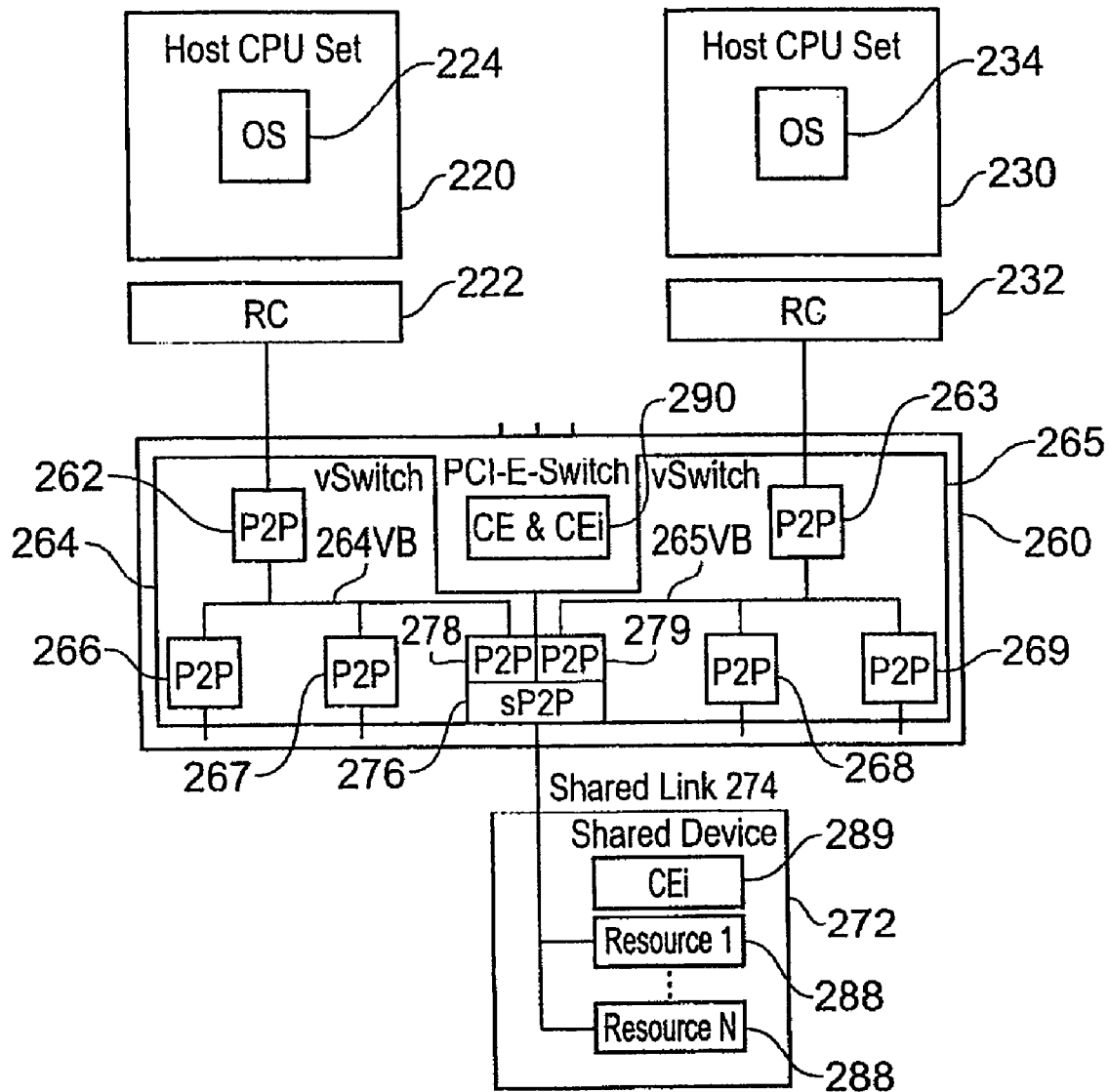
FIG. 9 is a schematic representation of an example embodiment of multi-host PCI-E device sharing.
Figure 10:
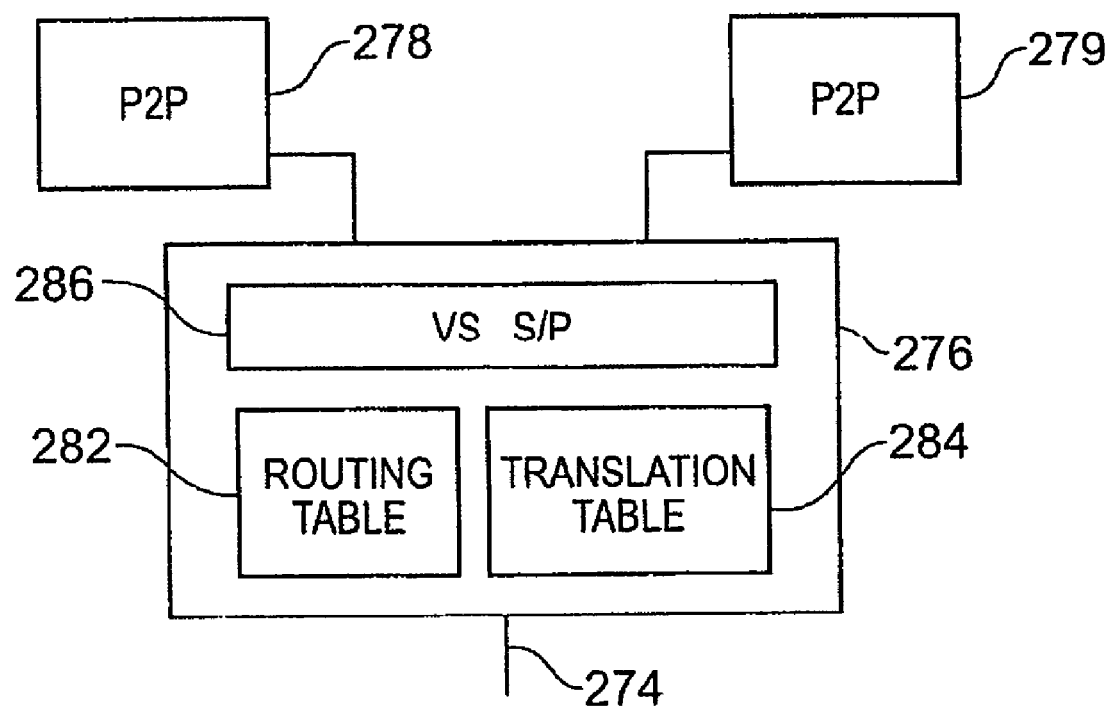
FIG. 10 is a schematic representation of a shared port.

FIG. 9 presents a simple overview of an example embodiment of an interconnect apparatus or device (e.g., a switch) 260 for multi-host PCI-E device sharing. Two hosts 220, 230, operating under an operating system (OS) 224, 234, are connected via root complexes (RCs) 222, 232 to respective upstream ports 262, 263 of a partitioned PCI-E Switch 260. The PCI-E Switch 260 is partitioned into two virtual switches (vSwitches 264, 265). Each virtual switch contains a single upstream port (P2P) 262, 263, zero-to-many downstream ports (P2P) 266, 267, 268, 269 and one-to-many shared downstream ports (sP2P) 276. The P2P ports can be described as physical ports. A shared sP2P port 276 is operable to connect to a sharable device 272 (e.g., an I/O device, a switch, etc.) through a shared PCI-E link 274. The shared link is a PCI-E interface 274 shared by multiple virtual switches 264, 265. In this example, each virtual switch 264, 265 attaches to a shared port (sP2P) 276 through one or more P2P bridges 278, 279. The shared port 276 with a bridge 278, 279 associated with a virtual switch 264, 265 can be described as a virtual port as this can provide port virtualization. As is shown in FIG. 10, the shared port 276 contains a routing table 282, an address translation table 284 (and/or a combined routing and address translation table) and virtual switch separation/protection 286. The sharable device 272 contains a number of resources 288 that the configuration entity (CE) 290 provisions to the hosts 220, 230. In the present instance, the configuration entity 290 is configured as part of the switch 260 of the interconnect apparatus. As will be explained in respect of another example embodiment later, the configuration entity could be configured as part of a host, or part of the switch, or some other entity (e.g. a service processor connected to the interconnect apparatus).

The provisioning of the shared device resources 288 can be determined by an out of band policy. The configuration entity 290 communicates with a configuration entity interface (CEi) 289 in the device that controls device resources that by nature are not sharable (e.g. reset, sharing policy, etc.).

Each resource 288 in the device 272 is represented as a PCI device or a PCI function. A sharable device contains N+1 functions, in which N denotes the number of virtual devices the shared device supports, and '1' is the single function allocated for the configuration entity.

Figure 11:
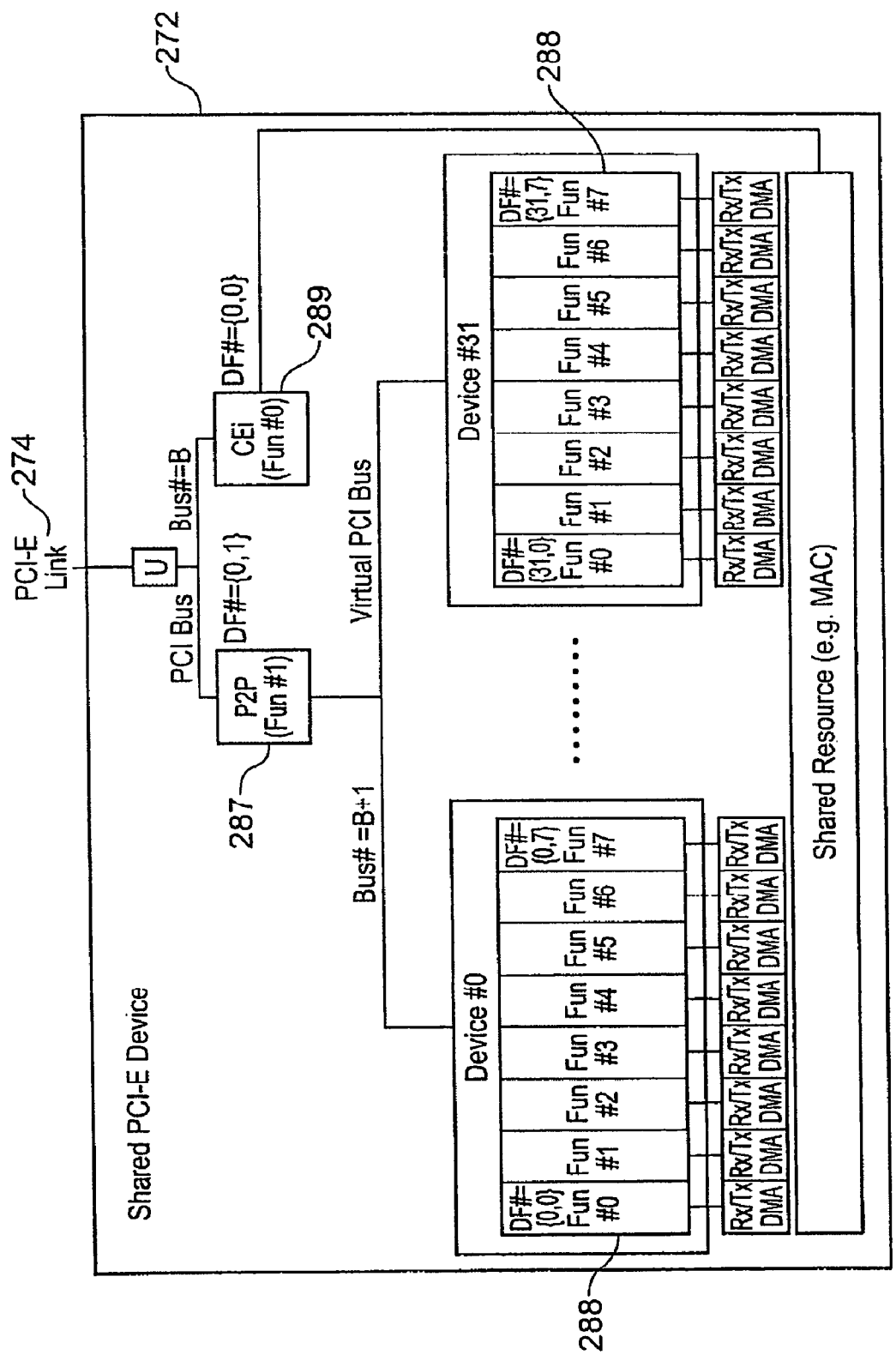
FIG. 11 is a schematic representation of an example of a shared PCI-E device.

An example of a shared device 272 is shown in FIG. 11, which illustrates a shared device 272 with a configuration entity interface 289 (function 0 of the device upstream port) and a P2P port 287 allowing expansion of up to 256 separate functions in the present instance. If the device supports less than 8 data functions, the P2P port 287 is not required and the function remains on the upstream PCI bus 274.

Functions are provisioned by the configuration entity 290 to hosts 220, 230 (or system images within a host). Re-provisioning of functions to other system images can take place through PCI-E Hot-Remove/-Add interrupt events that the configuration entity 290 initiates through the configuration entity interface 289.

Only a host 220, 230 or system image currently owning a function is allowed access to the function 288. An access control mechanism per function 288 can be provided.

In addition, to provide transparency for each host, each function is configured to have a separate address space per function 288 (configuration, I/O and memory address spaces per function). The host 220, 230, or system image, performs BAR configuration (Base/Limits) of the functions it currently owns. This and the access control mechanism mean that there is no address space overlap per function in the present instance.

In this document reference will be made to function in a shared device representing a resource 288 (e.g. DMA machine) as a virtual device (vDevice).

To provide for system transparency, compatibility with existing bus-enumeration protocols (e.g. BIOS/OBP) can be provided. To this a shared port (sP2P) within a PCI Switch is operable to translate (or virtualize) a Requester ID/Completer ID (i.e. BDF#) in transaction layer packets (TLPs).

In the following, example methods for doing this are illustrated.

In a first example, the configuration entity 290 performs bus-enumeration below the shared port (sP2P) 276. The host performs bus-enumeration above the shared port (sP2P) 276 and on the functions being provisioned to it. The shared port (sP2P) 276 provides a translation mechanism. This is described in further detail below. Each P2P bridge 278, 279 (one per virtual switch 264, 265) connected to the shared port sP2P 276 in the PCI-E switch 260 is also assigned a virtual host ID (vHostID—also referred to as a BDF#) representing the host 220, 230 of which device hierarchy this virtual switch 264, 265 is part. In cases where the Root Complex contains multiple virtual Root Complexes (each assigned to an independent partition (OS domain) in a hypervisor environment for example), and each virtual Root Complex has a unique BDF#, the P2P port 278 connected to the shared sP2P port 276 can contain one virtual host ID per virtual Root Complex.

A virtual device 272 being provisioned to a host 220, 230 can be presented to the host as a device on the respective virtual PCI bus 264VB, 265VB of the respective virtual switches 264, 265 or as part of a virtual device hierarchy below a P2P port 276 of that virtual switch virtual PCI bus 264VB, 265VB.

Memory and I/O transaction layer packet (TLP) requests in the downward directions (from host to virtual device) are routed based upon address until the shared port (sP2P) 276 as per the PCI-E specification. At the shared port (sP2P) 276, the Requester ID is replaced with the virtual host ID. Below the shared port (sP2P) 276, the TLP is primarily routed by the virtual host ID and secondarily by address (in case of the latter the virtual host ID is used as address qualifier).

A virtual device 288 uses the virtual host ID in the TLP as a function access control mechanism. That is, only TLPs with a virtual host ID equal to the virtual host ID that the configuration entity 290 assigned to the virtual device when it performed the provisioning are allowed to access the function. This is referred to as a key. This key could be part of the configuration space within the shared device 272. A virtual device 288 is operable to first validate that a TLP has access rights through comparing the virtual host ID of the TLP with the key. If there is a match, the virtual device 288 starts normal processing of the packet. If not it reports with an error.

Through the current PCI model, each host 220, 230 independently assigns BARs to each of its devices 288. Due to this, within this example of a multi-host shared device model, multiple virtual devices 288 may actually be in overlapping address ranges. However, as the virtual device 288 always checks the key within a TLP before consuming a TLP, and the switch downstream port 276 connected to the shared device 272 always performs an upstream routing decision based on a virtual device Requester ID, there is no need for the virtual switch (vP2P) 276 and/or the shared device 272 to consider target address mapping (e.g. PI/O with same address from different client hosts).

Memory and I/O TLP requests (e.g. DMAs) in the upstream direction (from virtual device 288 to host), are routed by a Requester ID in a TLP (i.e. the configuration entity assigned BDF# of a virtual device) from a virtual device 288 until a shared port (sP2P) 276. At the shared port (sP2P) 276, the Requester ID in the TLP is used as an index into the routing and translation tables 282, 284, so that the TLP is routed into the correct virtual switch 264, 265, and the Requester ID of the TLP is replaced with the Requester ID of the host assigned Requester ID of the function 288.

From the shared port (sP2P) 276 to the host 220, 230, the TLP is routed by address.

Configuration request and completion TLPs in the downstream direction (from host 220, 230 to virtual device 288) are routed by ID. At the shared port (sP2P) 276, the completer ID is replaced with the virtual host ID.

Completion TLPs in the upstream direction (from a virtual device 288 to a host 220, 230) are routed by the completer ID of the TLP (i.e. the Requester ID of the virtual device 228) from the virtual device until the shared port (sP2P) 276. At the shared port (sP2P) 276, the completer ID is used as an index into the routing and translation tables 282, 284, so that the TLP is routed to the correct virtual switch 264, 265 and the completer ID of the TLP is replaced with the Requester ID of the host assigned Requester ID of the virtual device/function.

As the PCI-E Specification is currently defined, a drawback of translation is a need to re-calculate the optional end-to-end CRC (ECRC) part of the TLP because the Requester ID field is modified. One would wish to avoid a potential data integrity issue as the ECRC would then not be end-to-end. The following method ensures that ECRC checking can still be used by making sure that the original ECRC value is replaced with a new value that reflects the updated field(s) as well as the unchanged part of the packets. An example method is outlined below (and is further explained in the paper "Preserving the integrity of cyclic-redundancy checks when protected text is intentionally altered" by D. R. Irvin, IBM J. RES. DEVELOP. VOL. 33 NO. 6 NOVEMBER 1989).

An example mechanism can work as follows:

Assume an incoming packet comprises the following fields:

DW1, DW2, DW3, ECRC (DW indicates 32-bits)

Suppose a Requester ID is part of DW2. The shared port (sP2P) 276 changes the DW2 to DW2'. A bitwise exclusive OR (XOR) can then be performed on each DW to generate a new ECRC:

(DW1 XOR DW1, DW2 XOR DW2', DW3 XOR DW3)

The new ECRC of the XORed DW above is ECRC'

The packet transmitted is then:

DW1, DW2', DW3, (ECRC XOR ECRC')

Thus the end-to-end CRC checking is kept.

Another example can work as follows:

Replacing the Requester ID/Completer ID in a TLP through the routing and translation tables 282, 284 in the shared port (sP2P) 276 could be entirely avoided if the configuration entity 290 assigns BDFs (Requester IDs) for all devices in the entire fabric. In this case, the ECRC is also no longer an issue. This is, however, not compatible with currently existing bus-enumeration protocols.

A further example can work as follows:

The configuration entity 290 could assign unique topology numbers to each client host device tree below the shared port (sP2P) 276. An example of this is explained with reference to FIG. 12.

Here a topology number is assigned by the configuration entity 290 to the shared port (sP2P) 276. In this case the shared device also contains a shared port (sP2P) 308 and one port (P2P) 310, 312 attached to the device shared port (sP2P) 308 per virtual switch 264, 265. Each virtual switch 264, 265 will be assigned a unique topology number. The topology number could be inserted in the reserved fields of the TLP or be added outside the TLP. In the existing PCI-E specification there are 8 reserved bits that could be used for this purpose. Whenever a TLP is crossing a shared port (sP2P) 276, 308, the shared port (sP2P) 276, 308 adds or removes the topology number. The topology number is protected by an LCRC and optionally by parity fields. Between the shared ports (sP2Ps) 276, 308 routing is based upon topology prefix and address/ID. The shared ports (sP2Ps) 276, 308 contain routing tables (compare FIG. 10) in which the topology number is used as an index.

The example described with reference to FIGS. 9 to 12 is based upon the provision of a configuration entity. Various characteristics of this example of an interconnection apparatus for sharing single PCI-E Device instances between multiple hosts connected via a single PCI-E fabric (i.e. one or more switches between the ports of the host bridges and the single PCI-E port of the shared device) will be outlined.

The configuration entity is able to control all aspects of a shared I/O device and/or I/O Service (an I/O unit, or IOU). In a shared device the configuration entity implements the provisioning of device resources to client hosts.

Client hosts are given access to individual resources within an IOU. A client host can only influence the operation of the resource(s) it owns. An I/O device resource is typically one or more DMA engine(s).

It may not be the configuration entity that polices the provisioning. This can be handled by independent management software.

If more than a single configuration entity has access to a single shared device instance, then it is assumed that the configuration entities coordinate their (master) operations on the IOU using some out-of-band mechanism.

In order to facilitate PCI-E Device sharing, the PCI-E device itself provides a number of mechanisms that can imply OS support.

Each client host can be given direct access to the resource (i.e. DMA engines) it has been provisioned within the device, that is the device provides separate register sets per DMA engine, so the device driver can post doorbell operations through PI/Os directly to the device.

The register set that is controlling the operation of a single DMA engine within the device is not accessible from any client host that is not a designated client host for this resource, that is the register set for a given resource does not overlap with the address range of the register set for another resource.

The device provides information that identifies the resource/DMA engine that initiated a transaction in the upstream direction (from device to client host/client partition) such that the PCI-E fabric can route the transaction to the correct client host.

Any DMA operation initiated from any DMA engine is only allowed to access the memory of the client host that owns the corresponding DMA engine independently of what memory address has been specified in the send/receive descriptor from the corresponding client host driver. The switch or the device qualifies that a given request only targets host memory (Virtual Address) that is legal for that DMA engine.

A client host can only make use of the resources that it has been provisioned. Also, no client host should be allowed to perform device configuration operations that may violate the policies upon which the sharing is based. In the case of the device being a NIC or a HBA (Host Bus Adapter), only a trusted master host may control how the device presents itself on the external LAN (VLAN/IP/MAC address) or SAN (WWN/Zone/LUN/) as well as which outgoing network packets will be forwarded from which DMA engine to which external network link and also which incoming network packets will be forwarded to which client host(s). The device keeps general control registers contained within a separate address area(s) not overlapping with the DMA register set areas. Further on, access to these areas is only provided to designated master hosts.

A client host that is assigned access to more than one device resource should be able to further assign these resources to individual Logical Domains belonging to this host.

MSI-X (Message Signalled Interrupt—eXtended) interrupt generation is associated with DMA resources in a way that allows the switch to forward interrupts to the same client host as the corresponding DMA operations.

In order to facilitate PCI-E device sharing that is transparent to the client host platform, a number of additional requirements can be fulfilled.

Each client host should be able to discover resources assigned to it as a normal PCI device/function using normal PCI bus-walk discovery methods (i.e. through Config requests). The host should see a resource it is allowed to use as an ordinary single device/function. The fabric represents a virtual device tree to the client host, and thus needs to provide mappings between the client host assigned function device ID and the actual device ID assigned by the master host.

Each client hosts observes BAR(s) information associated with the assigned device resources via PCI config operations.

Each client host should be able to assign its own PCI address range to such BARs.

A client host can see any PCI registers containing information about how a DMA engine owned by the client host is configured.

A client host should be able to specify memory addresses using any 64 bit value. The ID tag provided by the resource within the device may therefore not be part of the address forwarded by the client host.

Figure 13:
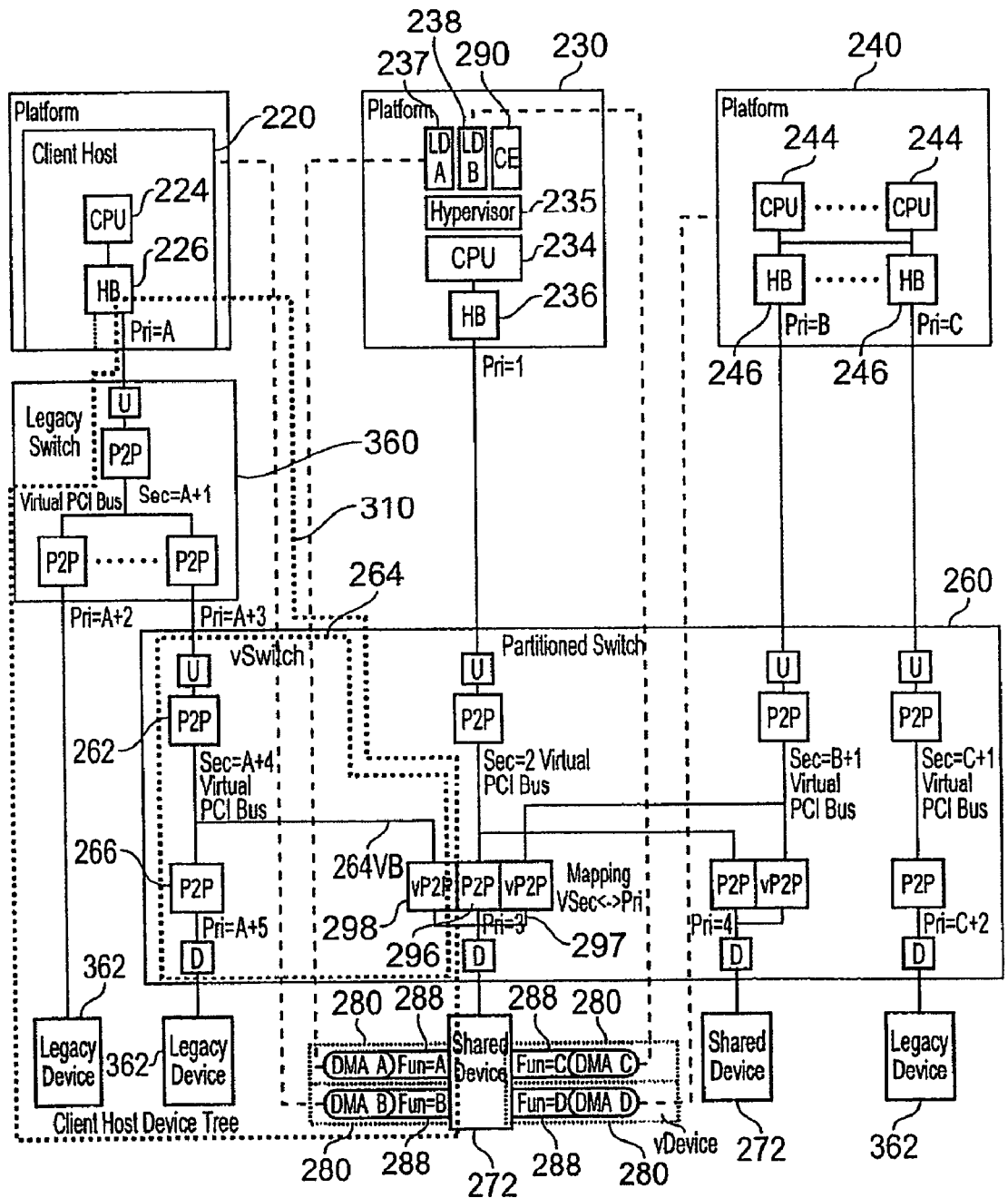
FIG. 13 is a schematic representation of another embodiment of multi-host PCI-E device sharing.

FIG. 13 is a schematic representation of another example of an application of an interconnect apparatus in the form of a switch 260 for providing multi-host shared I/O. As well as providing the sharing of an I/O device between multiple hosts (e.g., 220, 230, 240), the switch 260 can also be partitioned to provide multiple partitions (e.g., multiple virtual switch partitions such as the virtual switch 264).

Figure 12:
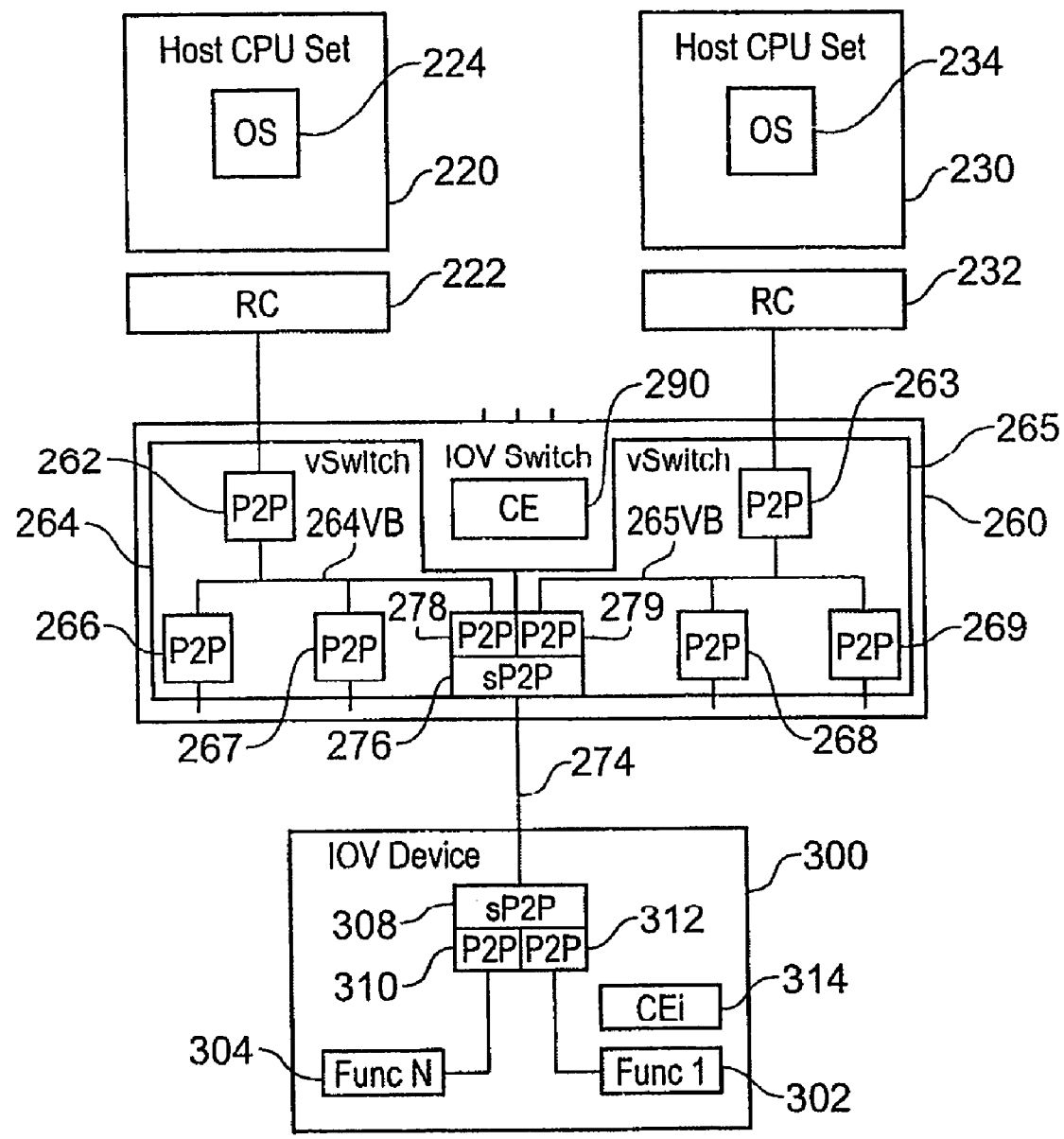
FIG. 12 is a schematic representation of another embodiment of multi-host PCI-E device sharing.

As with the example described with reference to FIGS. 9 and 12, the example shown in FIG. 13 provides port and I/O virtualization to provide multiple host support. Virtualization enables a host to believe that it has sole ownership of a device and enables it to create its own device tree. In the example shown in FIG. 13, a virtual device (vDevice) 280 within a shared device 272 is identified as a function (288). Each virtual device can contain a unique BDF#. As with the example described with reference to FIG. 10, if a shared device consists of more than eight virtual devices this can be expanded through virtual P2P bridges within the shared device. Each function is, moreover, represented with its own BARs.

A multi-host PCI-E fabric may include one or more of legacy switches 360, legacy devices 362, partitioned switches 260, and shared services. In the case that hosts 220, 230, 240 are connected to a partitioned switch, a configuration entity (CE) 290 can be operable to create switch partitions (e.g., virtual switch (vSwitch) 264) within the partitioned switch 260 (one virtual switch per host). In this example, the configuration entity 290 is illustrated as forming part of one of the hosts 230. In this case, the host 230 containing the configuration entity 290 is termed a master host, with the remaining hosts 220, 240 being termed client hosts. In the present example, the configuration entity 290 is run on a service partition. The configuration entity 290 can provision virtual devices 280 within a shared device 272 to client hosts 220, 240. When configured, a client host 220, 240 can then see its own device tree (e.g., 310) that may consist of legacy switches 360, legacy devices 362, virtual switch 264 and virtual devices 280.

A partitioned switch 260 may be configured with multiple virtual switches (e.g., 264). The upstream port 262 can provide connectivity upwards in the device tree towards its client host root complex and the one or many downstream ports (266) can provide connectivity to legacy switches and devices (362). In this example, of a partitioned switch, one or many virtual downstream ports (vP2P 298) can each provide connectivity to one or more virtual devices 280 within a shared device 272.

The upstream port and downstream port(s) are represented as P2P bridges. These P2P bridges are connected at their secondary bus interface (i.e. the inwardly directed interface) through a virtual PCI bus 264VB. The virtual downstream ports are represented as virtual P2P bridges (e.g., vP2P 298). The virtual devices 280 in a shared device 272 are connected to the virtual port (e.g., vP2P 298). Each client host is represented through on the virtual downstream port (e.g., vP2P 298). The secondary bus number of the secondary bus 264VB of the virtual port vP2P 298 is equal to the secondary bus number of the upstream port P2P 262 connected to the client host root complex.

In this example, forwarding in the upward direction, from a virtual device 280 to the client host 220 through the virtual port vP2P 298, is based upon the identity (ID) of the requestor (the Requester ID) within a transfer link packet (TLP). Each virtual device 280 contains a unique device ID (Requester ID). The downstream port 296 (representing one or more virtual ports (vP2Ps) 298) connected to the shared device 272 contains a routing table 297. The Requester ID is used as an index into this routing table. When the TLP has been routed into the correct client host device tree by the virtual port (298), normal routing mechanisms (as defined by the current PCI-E specification) can be used.

In the downstream direction from the client host 220 to a virtual device 280 through a virtual switch 264 and a virtual port 298, a normal routing mechanism (as defined by the current PCI-E specification) can be used.

To keep within existing bus-enumeration protocols, the virtual switch 298 within the virtual switch 264 can be operable to translate (or virtualize) a Requester ID. The configuration entity 290 configures each virtual port 298 with a unique virtual device ID representing the client host 220 owning the virtual device 280. When a TLP is forwarded in the downstream direction from a client host 220 to the virtual device 280, the virtual port 298 translates the client host Requester ID to the virtual port device ID. When a client host 220 is accessing a virtual device 280, similar translation takes place for the client host's assigned virtual device ID to the virtual device ID assigned by the configuration entity 290. Where the ID tag is based on an address, the virtual address should also be translated.

As described above, given the way the current PCI-E specification provides for an optional end-to-end cyclical redundancy check (ECRC), various approaches can be adopted to maintain ECRC protection, if required.

A client host should only be allowed to communicate with its assigned virtual device(s) within the shared device. As described above with reference to FIG. 9 this can be achieved through authorizations configured by the configuration entity 290, for example, using a unique key that can be defined per virtual device that could be part of the configuration space within the shared device. Each TLP accessing a device can then contain the key. A virtual device would only be allowed to consume a TLP if the key supplied with the TLP matches the key assigned to the virtual device by the configuration entity 290. This key could for instance be the device ID of the client host. Even if multiple virtual devices exist in overlapping address ranges, as a virtual device checks the key within a TLP before consuming a TLP, and the switch downstream port connected to the shared device performs upstream routing decision based on the virtual device Requester ID, there is no need for the virtual switch virtual port and/or the shared device to consider target address mapping. In this way, the key effectively identifies different address space hierarchies.

In this way, the virtual switch and configuration entity create the illusion to the client host that it actually operates on a normal legacy device, whereas it in fact it operates on a virtual device part of a shared device. As a result, the system platform is able to perform bus-walk, bus enumeration and configuration operations in a transparent way as if the I/O devices were not shared.

As shown in FIG. 13, a host may have different configurations. For example host 220 includes a host bridge (HB) 226 and a CPU 224. Host 230 includes a host bridge 236, and a CPU 234 supporting a hypervisor 235 environment with logical partitions/domains (Logical Domain A (LDA) 237 and Logical Domain B (LDB) 238) as well as the configuration entity 290. A further host 240 includes multiple host bridges 246 and associated CPUs 244. Each logical partition can run an independent OS, and thus represent a virtual host.

The partitioned switch also supports other virtual switches (not separately identified) associated with each of the host root complexes (i.e., one virtual switch per host root complex).

The number of virtual device/client host pairs per shared device can be constrained by the number of devices/functions that can be addressed below a downstream port connected to a shared device. In one example, a single multi-function device can support 8 functions (i.e. 8 virtual device/client host connections). This could be expanded through a P2P port. The secondary bus of this P2P port could then connect to 32 multi-function devices of 8 functions each providing 256 virtual device/client host connections. This could be further expanded by additional P2P ports at the cost of consuming bus numbers. Finer granular resource separation per client host (e.g. in a client host with multiple partitions) could be achieved by providing multiple resources (e.g. DMA channels) per virtual device. In one example, the "per function" DMA BAR is further split into logical BARs at a page granularity. This separation is orthogonal to the virtual device/client host separation.

The example interconnect apparatus shown in FIG. 13 is based on the notion of "Master Host(s)" and "Client Host(s)". Otherwise it is similar to that described with reference to FIG. 9. The example includes an interconnect apparatus for sharing single PCI-E Device instances between multiple hosts connected via a single PCI-E fabric (i.e. one or more switches between the ports of the host bridges and the single PCI-E port of the shared device).

A master host as in the example of FIG. 13 could be configured to control all aspects of a shared I/O device and/or I/O Service (IOU). In a shared scenario the master host(s) could then be configured to implement the provisioning of device resources to client hosts. Although the master host(s) can be configured to implement the device resource provisioning, this can instead be handled by independent management software, or by a configuration module. In the example in FIG. 13, the provisioning is actually performed by a configuration entity that forms part of a partition of the master host 230.

As indicated with reference to FIG. 9, rather than being implemented as part of the master host 230, in other examples, the configuration entity 290 could be configured as part of a host, or part of the switch, or some other entity (e.g. a service processor connected to the interconnect apparatus.

Figure 14:
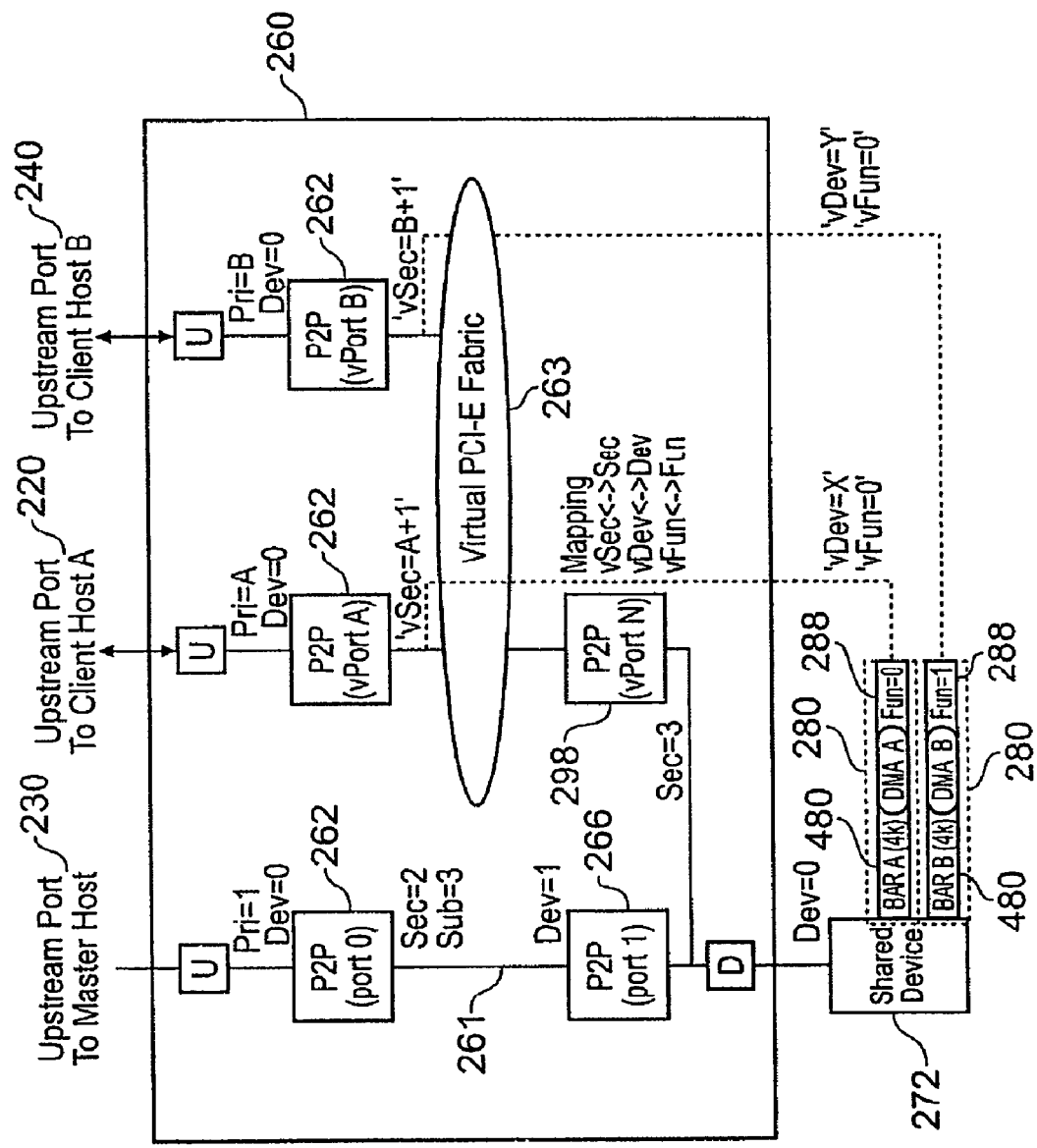
FIG. 14 is a schematic representation of an example of transparent device sharing.

FIG. 14 is a schematic block diagram providing another representation of an interconnect apparatus, for example a switch 260. The switch includes a number of ports that can be configured as upstream or downstream ports.

In FIG. 14, ports 262 are configured as upstream ports for connection via respective PCI-E buses to respective hosts 230, 220 and 240. Host 230 is configured as a master host and hosts 220 and 240 are configured as client hosts. Port 266 is configured as a downstream port for connection via a PCI-E bus to a shared device 272. The secondary bus of the downstream port 266 is connected by means of a virtual PCI-E bus 261 to the upstream port 262 that is in turn connected to the master host 230. The ports 262 and 266 are physical P2P ports.

Additionally, a virtual port (vP2P) 298 is connected to the shared device 272. The secondary bus of the virtual port 298 is connected via a virtual PCI-fabric 263 to the secondary buses of the ports 262 that are in turn connected to the client hosts 220 and 240.

In FIG. 14, the trusted master host 230 owns the physical device tree, and assigns BDFs to all of the physical devices present within its physical device tree. The device tree represents each virtual register set as a function. Thus, for example, virtual register sets BAR A 480 and BAR B 480 are represented as functions 288, fun=0 and fun=1, corresponding to respective DMA engines DMA A and DMA B, respectively, of the shared device 272. A configuration entity (not shown—which can be configured as management software operating on the master host 230 as described earlier) assigns one or more functions to client hosts (e.g., client host A 220 and client host B 240). When configured, a client host 220, 240 sees a virtual device tree consisting of the upstream P2P port and virtual downstream vP2P port(s) and the function(s) that have been provisioned to it.

Thus, the interconnect apparatus creates the illusion to the client host that the client host actually owns the physical device tree below the upstream port. The system platform is able to perform bus-walk and configuration operations in a transparent manner. As indicated in the Figures, the upstream port connected to each of the client hosts is represented as a P2P bridge. A virtual device tree is created by mapping the P2P secondary bus to the secondary bus number of the virtual downstream P2P assigned by the master host. Similar mappings take place for the device/function numbers.

Within the fabric, each virtual port contains a physical fabric port address. A binding is created between a virtual port and a physical port using a physical fabric port address. Where existing PCI-E packets are used, an 8-bit address can be advantageous. A larger address range would require either the use of vendor-defined messages or a PCI-E specification modification.

Each function (virtual device) within the physical device is represented with BARs for CSR, DMA, and MSI-X. These are typically page-bounded (each DMA could be represented within a 4 k page, for example).

Figure 15:
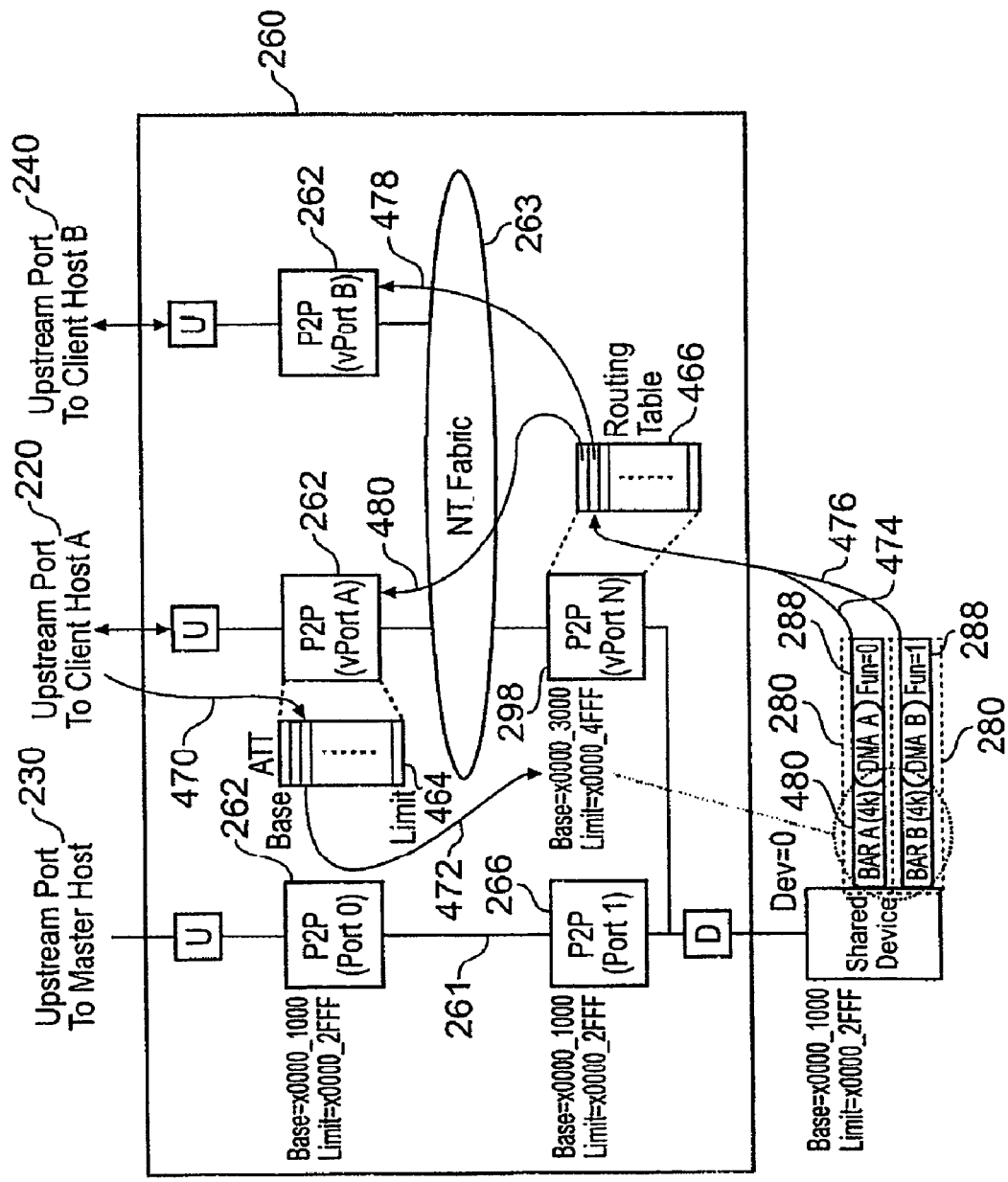
FIG. 15 is a schematic representation of address translation in an example of an interconnect apparatus for transparent device sharing.

The downstream and upstream address translation is illustrated in FIG. 15. In FIG. 15, the same reference numerals to those shown in FIG. 14 are used for like features, and accordingly, the description of those features will not be repeated here.

In the downstream direction, the upstream port BAR range points 470 to an address translation table 464, in which each entry provides a representation of a virtual downstream port BAR range (e.g., each entry represent a virtual device). An entry pointed to provides a link 472 to the virtual PCI-E fabric destination port for this request and upper bits for the new address. In the upstream direction the port connected to the physical device identifies which resource issued the TLP. In a transparent mode the ID (device number and function number) can be used. This tag can be used as an index 474, 476 into a routing table 466, which entries provide a link 480, 478 to a virtual PCI-E fabric destination for this request. The assumption here is that a device has qualified a virtual address as indicated earlier. In addition, interconnect apparatus can replace a Requester ID (physical Device ID of the function)

with the virtual Device ID (assigned by upstream client host), such that completions (from host to virtual device) can be routed properly by interconnect apparatus.

In the examples described with reference to FIGS. 9 to 15 as described above, the device sharing could be said to be transparent with respect to the operating system. For example, in the examples described above, there is no need for the virtual switch 264 and/or the shared device to consider target address mapping (e.g. PI/O with same address from different client hosts).

Where PCI-E device sharing is transparent to a client host platform and the OS (i.e. Nexus driver) various characteristics may be observed.

For example, each client host may be able to discover resources assigned to it as a normal PCI device/function using normal PCI bus-walk discovery methods (for example using configuration requests). The virtualization is such that the host can see a resource it is allowed to use as an ordinary single device/function. The fabric can represent a virtual device tree to the client host, and provide mappings between the client hosts' assigned function device IDs and the actual device IDs assigned by the master host.

Each client host can observe BAR(s) information associated with the assigned device resources via PCI configuration operations. The client host can partition I/O addresses and assign BAR ranges as it desires. A fabric manager may program the switch address mapping to map the various BAR address ranges that the client host will use into target node and target address ranges. In this way, the host can have the illusion of operating in a full (e.g., a 64 bit) address space. As fully virtualized BAR handling implies mapping from arbitrary 64 bit address ranges, the switch port capacity for implementing individual map entries can restrict the number of "virtual BARs" that can be supported by a switch port. Each client host can assign its own PCI address range to such BARs.

A client host can see any PCI registers containing information about how a DMA engine owned by the client host is configured. A client host can influence some of the relevant device configuration information (e.g., in order to perform "ifconfig" commands for a corresponding logical network interface within the OS). However, there is no requirement about such information being forwarded to a device in any particular way.

A client host can specify memory addresses using any value within the complete address range (e.g., 64 bits). An ID tag provided by the resource within the device need not, therefore, be a part of an address forwarded by the interconnect apparatus to the client host.

In other example embodiments, however, a PCI-E device to be shared could be configured to provide a number of mechanisms, for example with operating system (OS) support. In such a case, there may be examples where sharing could be described as non-transparent. Examples of such non-transparent sharing will be described in the following.

As described above, each client host can be given direct access to a resource (e.g., a DMA engine) that is has been provisioned within the shared I/O device. The device can provide a separate register set per DMA engine. In this way, a device driver can post doorbell operations through PI/Os directly to the device. A register set controls the operation of a single DMA engine within the shared I/O device such that it is not accessible from any client host that is not a designated client host for this resource. In other words, the register set for a given resource is configured not to overlap with the address range of the register set for another resource. Each DMA register set can be arranged to exist either within a page window in which the page size is at least the page size of the client host(s) using the device, or within a separate BAR.

In a non-transparent example, a switch and/or a client host driver (and/or client host host-bridge/memory map in the case of multiple logical partitions, or domains (LDs), within a host) can, for example, be configured to restrict access to only the resource that has been allocated to the client host/client partition.

The device can also provide information that identifies the resource that initiated a transaction in the upstream direction (from device to client host/client partition) such that the PCI-E fabric can route the transaction to the correct client host. The identification (ID tag) can, for example, be in the form of high-order address bits within the PCI-E request or in the form of device/function numbers. The maximum number of resources within a device could, for example, be 256. The ID tag is used as an index into a routing table at the port in the PCI-E fabric that directly connects to the device. The VA (virtual address) within a TLP that a PCI-E Fabric forwards from one of its upstream ports to a host is arranged to comply with the addressing format of the host.

The interconnect apparatus can be arranged such that any DMA operation initiated from any DMA engine that forms a device resource can only access the memory of the client host that owns the corresponding DMA engine. The interconnect apparatus can be configured to effect this independently from which memory address has been specified in the send/receive descriptor from the corresponding client host driver. An interconnect apparatus (e.g., a switch), or the device can be arranged to qualify that a given request only targets host memory (virtual address) for that DMA engine.

The interconnect apparatus can be configured such that a client host can only make use of the resources that have been provisioned to it.

The interconnect apparatus can also be configured such that a client host cannot perform device configuration operations that may violate the policies that the sharing is based upon. Where the device is a NIC or a HBA, the interconnect apparatus can be configured such that only a trusted master host can control how the device presents itself on an external LAN (VLAN/IP/MAC address) or SAN (WWN/Zone/LUN/) as well as which outgoing network packets will be forwarded from which DMA engine to which external network link and also which incoming network packets will be forwarded to which client host(s). To facilitate these functions, the device can keep general control registers contained within a separate address area(s) not overlapping with the DMA register set areas. Further on, access to these areas can be provided only to designated master hosts.

A client host that is assigned access to more than one device resource can be able to further assign these resources to individual logical domains (LDs) belonging to this host. Each such ID can operate as an individual client host. With this in mind, each DMA register set can exist either within a page window in which the page size is at least the page size of the client host(s)/partition(s) using the device. Also, the device can be arranged to restrict host memory addressing that can be generated in order to fit within a restricted range within the target client host. The host can ensure that the target memory address range that the host bridge represents is divided into non-overlapping segments that can be assigned to different IDs. This segment provisioning is then to be coordinated with the configuration of the corresponding DMA engine(s).

Any interrupts can be associated with DMA resources so that the switch forwards interrupts to the same client host as the corresponding DMA operations.

Figure 16:
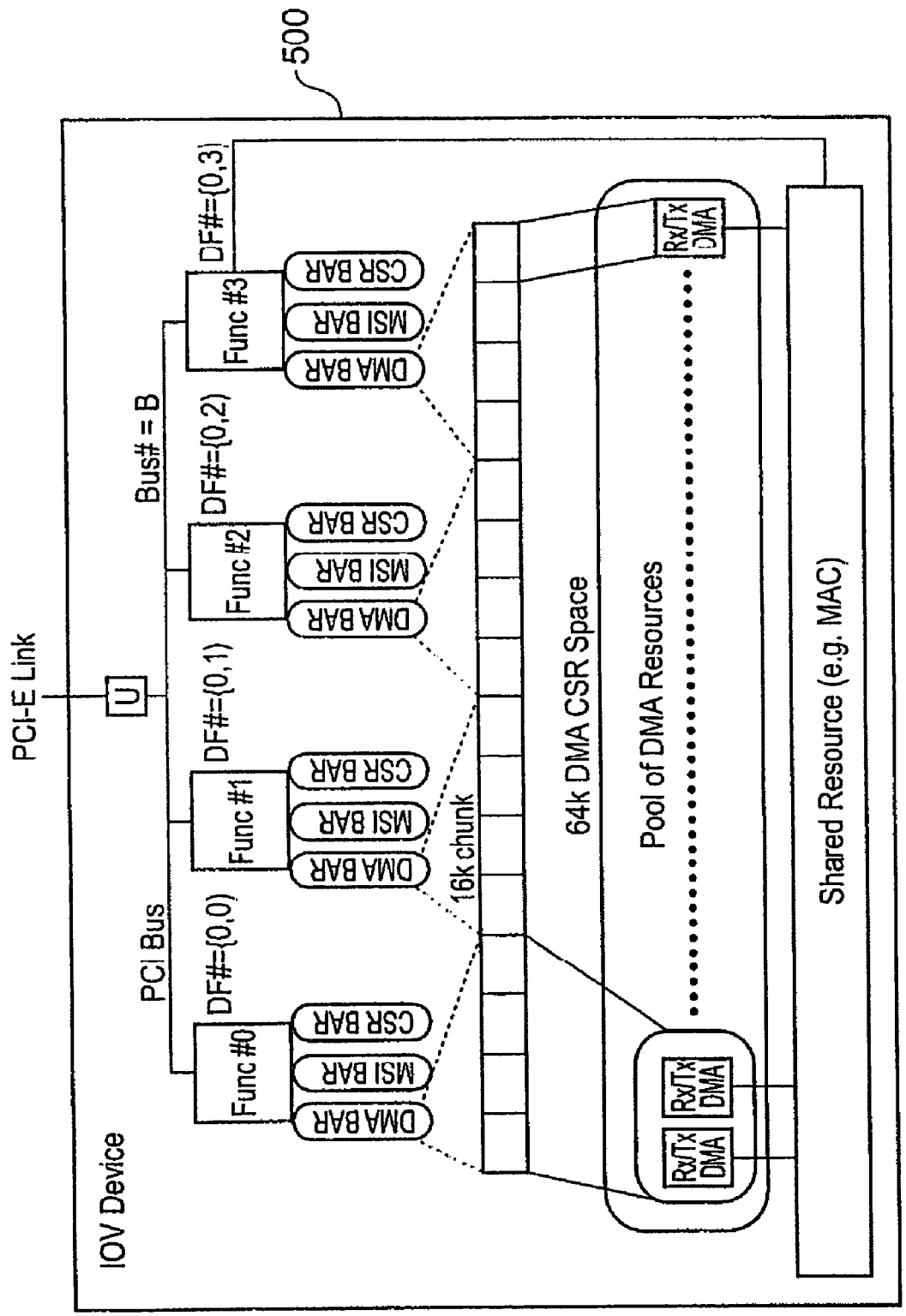
FIG. 16 is a schematic diagram illustrating an example of non-transparent device sharing.

In the following, there will now be described an example of non-transparent I/O device sharing based on a NIC 500 shown in FIG. 16 that provides dual 10GBE ports or quad 1GBE ports with advanced packet filtering, 16 DMA channels for receive (Rx) and 16 DMA channels for transmit (Tx). This example NIC 500 provides the following PCI-E features, namely x8 ports, a single device with four functions and 3 BARs per Function (CSR, DMA, and MSI-X).

This example can provide transparent device sharing through the interconnect apparatus of up to 4 client hosts as described above with reference to FIGS. 9 to 15. To provide support beyond 4 client hosts (4 functions), a single BAR can be split into multiple logical BARs. In this example, the total number of DMA CSR is 64 kB, shared by 4 functions at 16 kB each. To extend this, virtual BARs of 4 kB each can be created, by splitting the 16 kB DMA bar per function into 4 kB blocks.

Such a NIC can also be presented as a single function device, with 3 BARs, one for CSR, one for DMA, and one for MSI-X. In this case the DMA BAR points to the entire 64 k region, and is thus composed of 16 4 kB chunks (virtual BARs). (In the following description we refer to a DMA BAR that points to the entire 64 k region, and is thus composed of 16 4 kB chunks (virtual BARs), although the method described equally applies for a function with 4 virtual BARs).

Each 4 kB chunk might be provisioned to independent hosts and/or system images, and thus provides support for up to 16 clients. These virtual BARs are not identified during a PCI bus walk (i.e. they are not identified with a separate BDF and separate config space).

This example of non-transparent sharing is based upon the notion of 'Master Host(s)' and 'Client Host(s)'.

A master host is able to control all aspects of a shared I/O device. In a shared scenario, the master host(s) implement the provisioning of device resources to client hosts.

Client hosts are given access to individual resources within an IOU. A client host can only influence the operation of the resource(s) it owns. An I/O device resource can be one or more DMA engine(s).

Figure 17:
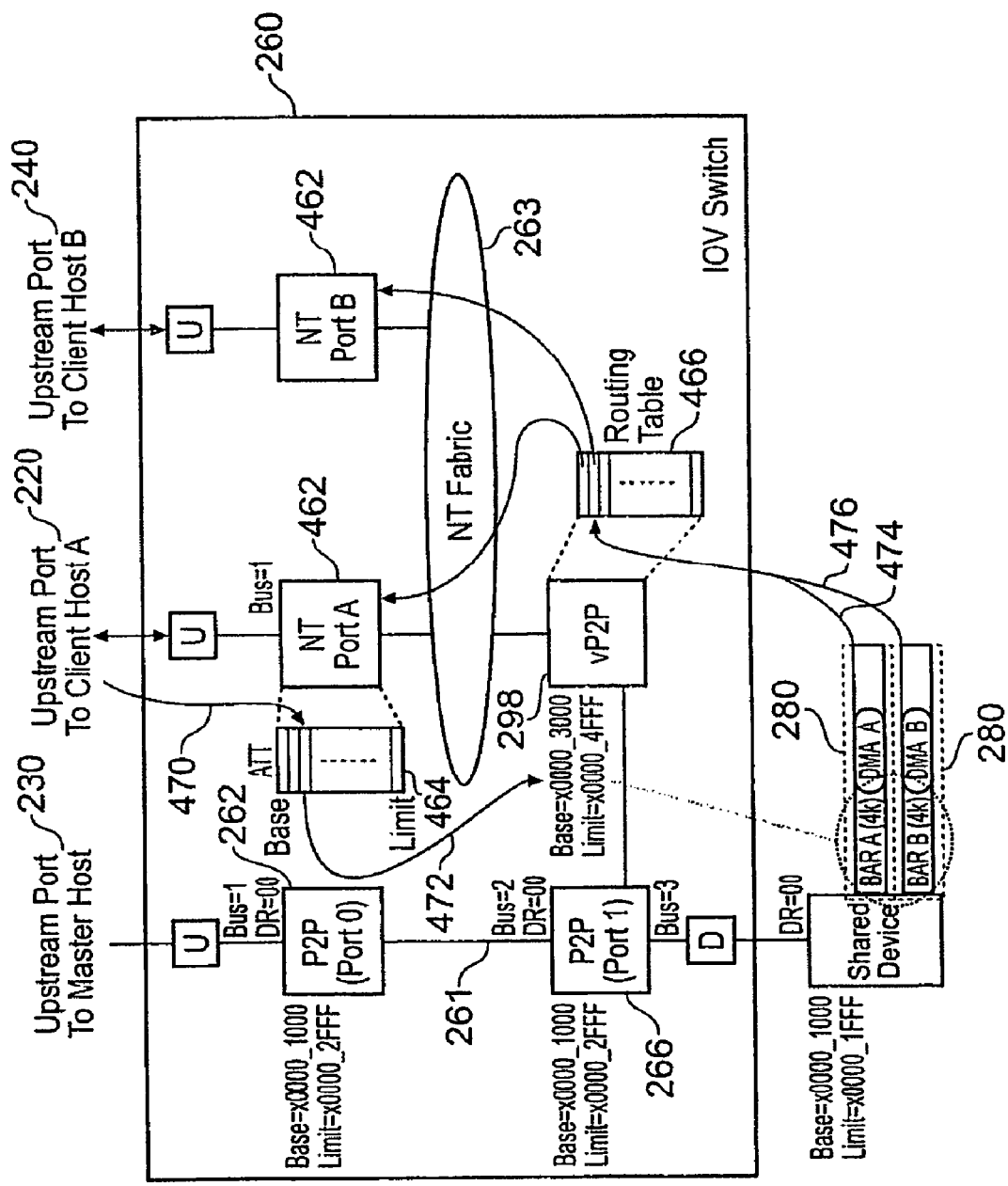
FIG. 17 is a further schematic diagram illustrating an example of non-transparent device sharing.

It may not be the master host that performs the provisioning. This can be handled by independent management software. FIG. 17 illustrates a possible configuration for implementing such a model. It will be noted that it is generally similar to the arrangement illustrated in FIG. 14, but in the example shown in FIG. 17 the upstream ports that are connected to the client hosts 220 and 240 are described as non-transparent (NT) ports 462.

The master host owns the device tree that the physical shared device is part of, and performs bus enumeration and BAR assignments for the Switch P2Ps and the shared device. A client host sees the upstream switch port (NT port) 462 as a memory end-point. A client host 220, 240 only performs bus enumeration and BAR assignments down to this port.

There are a number of possible approaches for presenting the virtual device to the client host.

In one example, the upstream port 462 can be represented in the PCI-E fabric connected to the client host as a PCI-E memory endpoint. However, this is not completely transparent to the client host 220, 240 as it would require a virtual nexus driver between the actual nexus and the device driver. This virtual nexus driver is a device driver for the PCI-E upstream port 462 (memory endpoint). This device driver can be arranged to communicate with master host software to obtain a representation of virtual BARs that it exposes to the device driver. Based upon this the virtual nexus driver configures the address translation table in the NT port 462. Downstream, the address translation table 464 translates between the actual virtual BAR exposed to the client host, and the actual virtual BAR assigned by the master host. In addition, it replaces the Requester ID of a TLP with the Requester ID of the master host. Where an ECRC is present, appropriate measures can be taken, for example along the lines described above with respect to transparent PCI-E sharing.

The device provides support for allowing a master host 230 to control the upper 20 most significant bits (MSBs) of the DMA address. Validation of these bits is also performed by the device in order to ensure that DMA transfers are posted/fetched from the proper client host. Part of this address (upper 20 MSBs) can be used to identify the DMA that initiated a transaction. This identification tag is used by the switch port as an index into the routing and translation table of the downstream port (vP2P) 298 that is connected to the shared device. The translation involves translating the MSB bits of the TLP, and replacing the Requester ID of the device with the Requester ID of the NT port. If ECRC is present this will be recalculated (see above).

The interconnect apparatus 260 provides a CSR per port that determines the index (part of address) to be used. The address presented to the client host is arranged to be compliant with its addressing scheme. For 32-bit client hosts the PCI-E fabric prepends/removes the upper part of the address (32 MSB) before a TLP is forwarded. Some processors (e.g., AMD64 ISA) support 52-bit physical addresses (PAs). Others (for example current AMD Opteron processors) support 40-bit PAs. Other hosts (e.g., Sun4v ISA) can support a PA consisting of address (44-bits), context ID, and partition ID).

In another example, the configuration space can be virtualized. A configuration entity within the PCI-E fabric is operable to inspect every configuration request issued, and complete the requests according to device and device driver requirements. The configuration entity forms a virtualization engine that intercepts configuration operations and controls which resources and what topology is being presented to the client host when the host is exploring its (virtual) PCI-E hierarchy. When the client host subsequently assigns bus and device numbers, and assigns BAR address ranges, the virtualization engine observes this and makes sure that proper mappings of addresses and IDs are set up in both the upstream and downstream directions.

Non-transparent sharing is also possible for I/O devices (for example legacy devices) that are not in themselves configured to be shared. In one such example of non-transparent sharing, a master owns the configuration space of a physical device tree, and provides I/O services. Each device contains generic device drivers (one for storage (typically block-based) and one for the network). The client host can be arranged to see the PCI-E fabric as a memory end-point. Then, if an address of a packet falls within the range programmed in the translation table, the packet can be routed to the appropriate client host.

Client hosts can subscribe to the I/O services provided by the master host through inter-processor communication across the PCI-E fabric. For example, the interconnect apparatus can provide an inter-processor (or inter-host) communication channel. Client hosts can then use this inter-processor communication channel to request data movement. The master host translates virtual I/O requests into I/O requests to one or more PCI-E devices. Device data is DMAed directly to the client host(s) by the use of the upper address bits in the virtual address, which are used as an index into the routing table within the downstream port connected to the device. This routing table is set up by a trusted master host or by trusted management software. Alternatively, data could be delivered to the master host and then delivered through the client host through IPC, but this implies the penalty of store and forward. This approach permits simple device sharing of devices that do not as such support sharing requirements (e.g., legacy FC HBAs). This approach enables sharing of PCI and PCI-X devices that are indirectly attached to the shared fabric via legacy bridges, and it also enables aggregation of multiple independent devices when implementing a single I/O request.

Thus there has been described an interconnect apparatus, for example a switch, that supports PCI Express. The apparatus has a first plurality of ports configurable as upstream ports, each connectable to a respective host, and at least one port configurable as a downstream port connectable to a device. The apparatus is operable to support sharing of the device resources between hosts.

In an infrastructure as described above, legacy PCI Express host bridge hardware and devices are used. The transparent and non-transparent shared PCI Express fabric implementations can perform routing or address mapping as a function of the "root complex" whereby a transaction "belongs to" the root complex.

In the transparent case, in particular, it is desirable to be able to add a tag to a packet to indicate to which virtual PCI Express hierarchy the packet belongs (to which root complex and/or host it belongs) in a manner which has a minimum impact on the existing infrastructure. The motivation for minimising changes is to allow as much as possible of the current PCI Express device interfaces and switching logic to be reused in shared environments. For example, where small configurations with limited scaling requirements are used, which can be sensitive to increased cost and/or changes in configuration and management aspects, it is particularly desirable to be able to reuse existing formats and routing logic.

In order not to reduce the reliability of a system, it is desirable to be able to preserve the end-to-end cyclical redundancy check coding (ECRC) of the packet. Preserving the ECRC implies that the original ECRC field is not modified or updated between the two end points, (i.e. between the start point and the final end point). If it is changed or updated, this would imply that hardware logic along the path between the start and final end points may be malfunctioning and introduce an error that could then not be detected by the ECRC check at the destination node.

A shared PCI Express infrastructure can typically involve a small to a moderate number of physical end nodes (both host nodes and I/O nodes). However, when the physical end nodes can be decomposed into multiple logical entities as described above (e.g., into multiple logical domains/system images and/or various kinds of virtual resources), the number of logical end nodes can potentially be very high.

Each logical end node (in particular each logical host node) should be able to represent a full address space (e.g., a full 64 bit address space). Accordingly, it may not be desirable to use any address bit to identify an end node. Also, it may be desirable that all PCI Express transactions can identify both source and target end nodes so that proper access control can take place at the end nodes as well as within the shared switching fabric.

Further, in particular for host nodes, it can be desirable to be able to represent multiple address spaces within a single logical end node. It may also be desirable to be able to re-use virtual address space portions in a way that makes sure that stale use of corresponding address space is detected in a well defined manner without disturbing the current use of the same address portion.

As described in the earlier description, a shared PCI Express system may include nodes that contain hardware, firmware and software that are fully aware of the shared nature of the PCI Express infrastructure. However, it may also contain legacy nodes (e.g., host nodes) that expect to see a conventional private PCI Express infrastructure of bridges/switches and devices that do not have an awareness of a shared nature for the PCI Express infrastructure. Accordingly, it is desirable that such legacy nodes are able to operate in a virtualised environment that maintains the required legacy (private) view of the resources that were available to the respective nodes.

There will be described in the following an example of an approach to extending a conventional PCI Express packet header beyond the current PCI Express specification. The current PCI Express packet header information defines a 16 bit requester ID and a 64 bit address. The approach described in the following enables the maintenance of the original packet format to provide support for the legacy nodes.

The approach described in the following is based on the provision of an additional header that can include one or more of a source ID, a target ID and a resource key. The additional header could also be termed a supplemental header, for example. The source ID, target ID and resource key can in principle have any desired size, but in the present example, a 16 bit format is used for the ID values, and a 32 bit format is used for the key value. This corresponds to the InfiniBand™ local address (LID) and remote access key/resource key (R_Key) formats. InfiniBand™ is a standard architecture defined and administered by the InfiniBand™ Trade Association for connecting multiple independent processor platforms (i.e. host processor nodes), I/O platforms and I/O devices. A full definition of the InfiniBand™ Architecture may be found in the InfiniBand™ Architecture Specification Volumes 1 and 2, available from the InfiniBand™ Trade Association.

The new header can be provided with its own protection, for example in the form of a cyclical redundancy check (CRC), for example an end to end CRC (ECRC), so that it can be added to an existing packet and stripped off again without affecting the integrity of the original packet, but still allow both the original packet and the additional header to be fully CRC protected when passing through buffers, hardware logic, and physical wires within the infrastructure.

In order to support legacy end nodes, the additional header can be added by an ingress infrastructure port and stripped off by an egress infrastructure port, for example after traversing multiple intermediate infrastructure elements that support routing based on the additional header. In a particular example, the additional header is added at an ingress switch port, traverses a single or multiple intermediate switch instances and is stripped off by an egress switch port.

For target end nodes that are aware of the new protocol, the additional header can be passed on to the end node. In this regard, end node type/protocol support can be provided as part of the runtime configuration information for egress/ingress switch ports.

The header values for headers that are added, or inserted, by the ingress switch port can be constructed based on a mapping from the requester ID and/or the address fields in the original packet. An example mechanism for providing the header values is described with reference to FIG. 23 below.

The mapping can be configured to ensure that only legal target IDs can be generated, and that a source ID uniquely identifies a legacy end node within the shared PCI Express infrastructure.

Source end nodes that are aware of and can handle the generation of an additional header can create and add the additional header when initially transmitting a packet. In this case, an ingress switch port simply verifies that the source ID is legal, and that the target ID is a legal destination for this source ID.

The resource key may be used by aware end nodes to identify target address space or a node specific resource as well as access rights for the corresponding entity. Conceptually, the key value is an extension of the 64 bit address, but typically it can be decomposed into a resource index portion as well as a key portion so that the supplied key value can be matched against a key value associated with the resource index. In this manner, access rights for a specific resource index can be revoked by changing an associated key value.

For legacy end nodes, the resource key can also be used to enforce access control within a shared switching fabric. In this manner, it can be possible to implement more dynamic access control schemes within the fabric and with a finer granularity than simply the end nodes.

Figure 18:
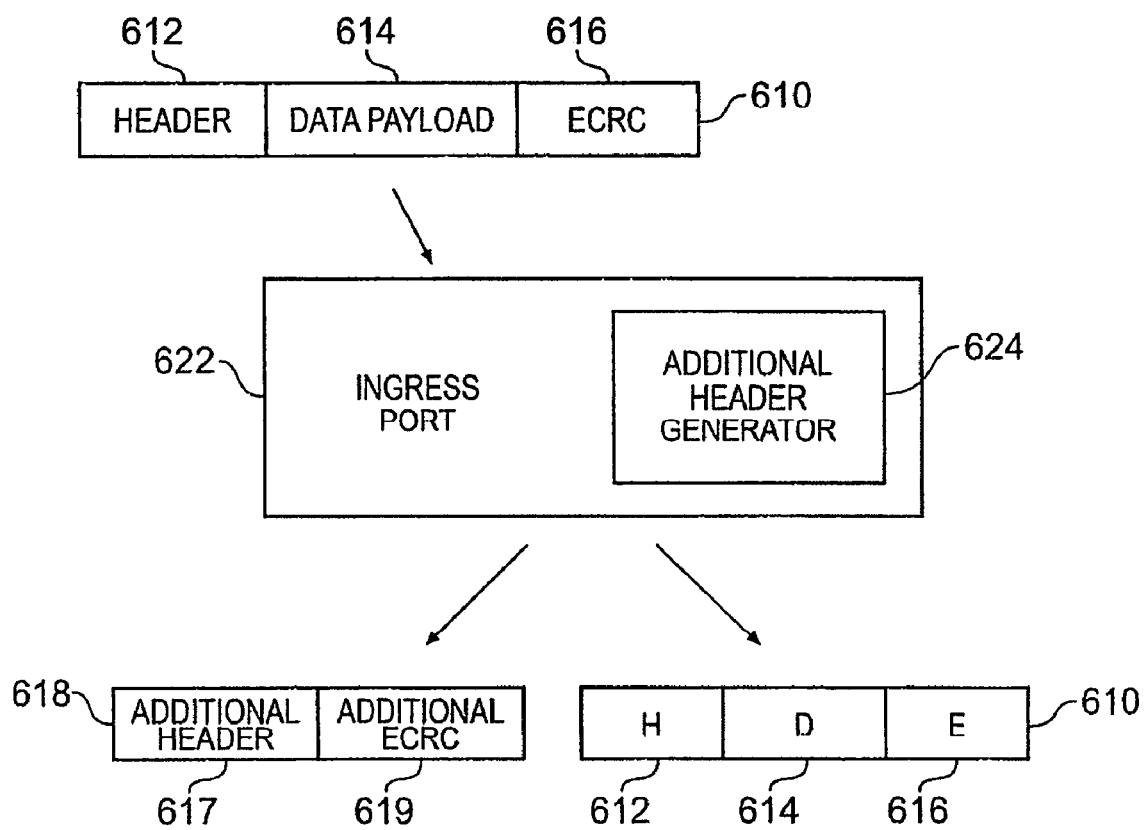
FIG. 18 is a schematic representation of a transaction packet with a verified hierarchy tag.

FIG. 18 is a schematic representation of the generation of an additional header by an ingress port. As illustrated in FIG. 18, it is assumed that a transaction packet 610 (i.e., a transaction layer packet 610) is received from a root complex. The transaction layer packet 610 includes a header portion 612, a data payload portion 614 and an end to end CRC (ECRC) 616.

Within the ingress port 622, an additional header generator 624 is provided that computes an additional header packet 618 including an additional header 617 and an additional ECRC 619. The additional header can be calculated using a segment table mechanism as described in FIG. 23. In that segment table mechanism described with reference to FIG. 23, channel specific information can include the additional header information 617, and an additional ECRC 619 can be generated from the additional header information 617.

The ingress port 622 can be operable to transmit the additional header packet 618 immediately prior to transmission of the transaction packet 610. Subsequent nodes within the infrastructure can be configured to recognise the additional header packet, and on the basis thereof, to recognise that the immediately following packet will be a transaction packet which effectively forms a payload for the additional header packet.

In this regard, it should be noted that the additional header in the present instance is generated as a packet separate from the transaction packet to which it relates. However, in other examples, the header packet could be provided in a format where the additional packet is a direct payload of, and is transmitted with the additional header packet 618.

Figure 19:
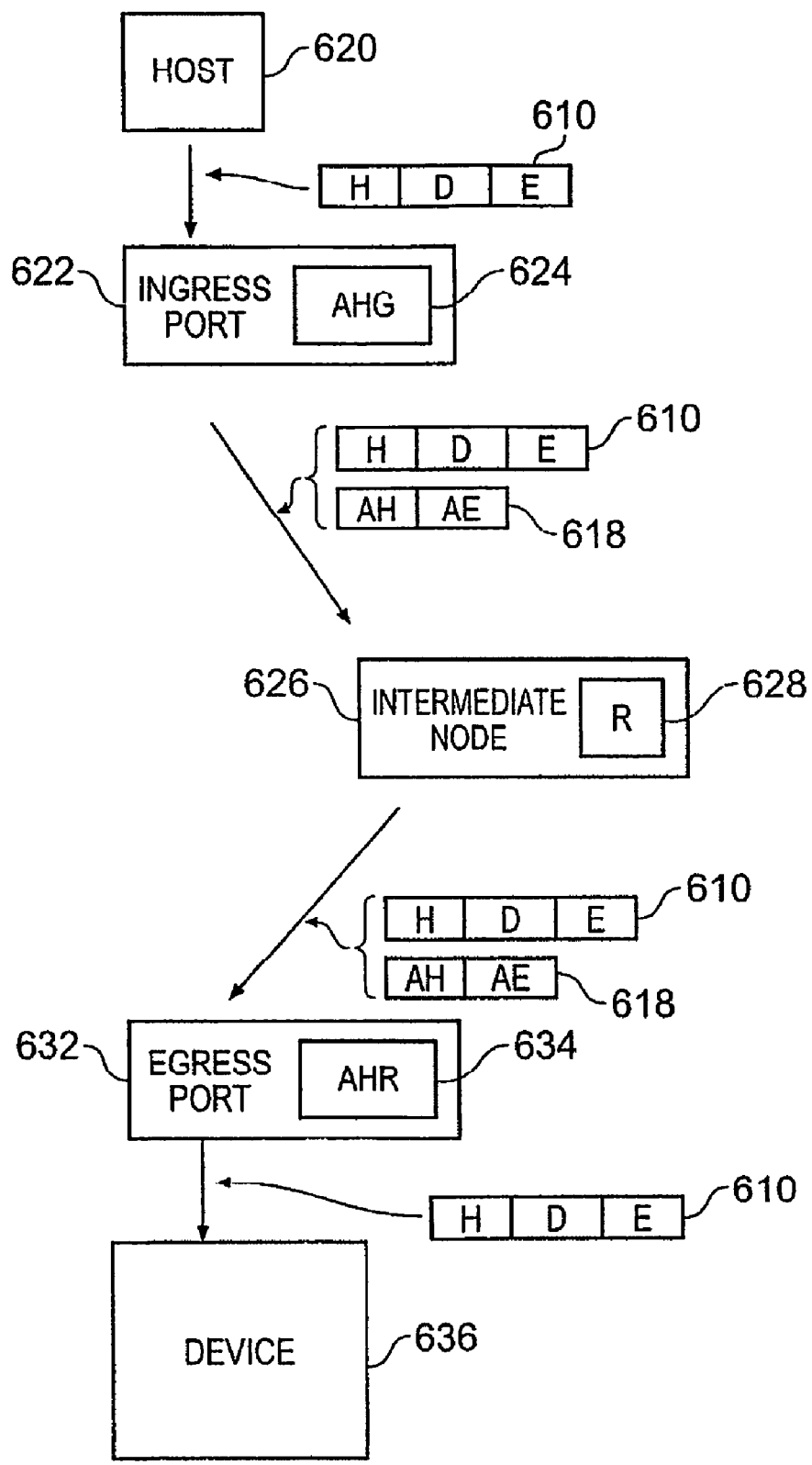
FIG. 19 is a schematic representation of the addition and subsequent removal of a verified hierarchy tag in an infrastructure.

FIG. 19 illustrates an example of the routing of a transaction packet 610 from a root complex at a host 620 to a device 636.

As described with reference to FIG. 18, it is assumed that an ingress port 622 receives the transaction packet 610 and that an additional header generator 624 generates an additional header packet 618 including the additional header and the additional ECRC for the additional header. The ingress port 622 is operable to transmit the additional header packet 618 and then immediately thereafter to transmit the transaction packet 610.

As described above, if the host 620 is a host that is aware of the revised protocol described herein, including the generation of an additional header, the host 620 could be operable to generate the additional header packet 618 and to transmit that to the ingress port immediately preceding the transaction packet 610. In this instance, the ingress port 622 and the advanced header generator 624 will be operable merely to verify the additional header and to verify the contents thereof.

An intermediate node 626 can be provided with routing logic 628 that is responsive to receipt of an additional header packet 618, to route the additional header packet 618 and a packet received immediately thereafter (i.e., the transaction packet 610) in accordance with the routing information in the additional header packet 618. The intermediate node 626 and the routing logic 628 can be operable to provide conventional operations of checking the ECRC of the additional header packet and the transaction packet 610 in the normal way.

In the instance shown in FIG. 19, the routing logic 628 of the intermediate node 626 is operable to transmit the additional header packet 618 and the transaction packet 610 to the egress port 632 in accordance with the routing information in the additional header packet 618. At the egress port 632, additional header removal logic 634 is operable to remove the additional header 618 and to forward the transaction packet 610 to the device 636 in accordance with the routing information in the additional header packet 618. The additional header removal logic 634 can be operable to provide conventional checking of the ECRCs of the additional header packet 618 and the transaction packet 610 in a conventional manner.

In the event that the device 636 is capable of processing an additional header packet 618, the egress port 632 can be operable to transmit the additional header packet 618 and the transaction packet 610 to the device 636.

Figure 20:
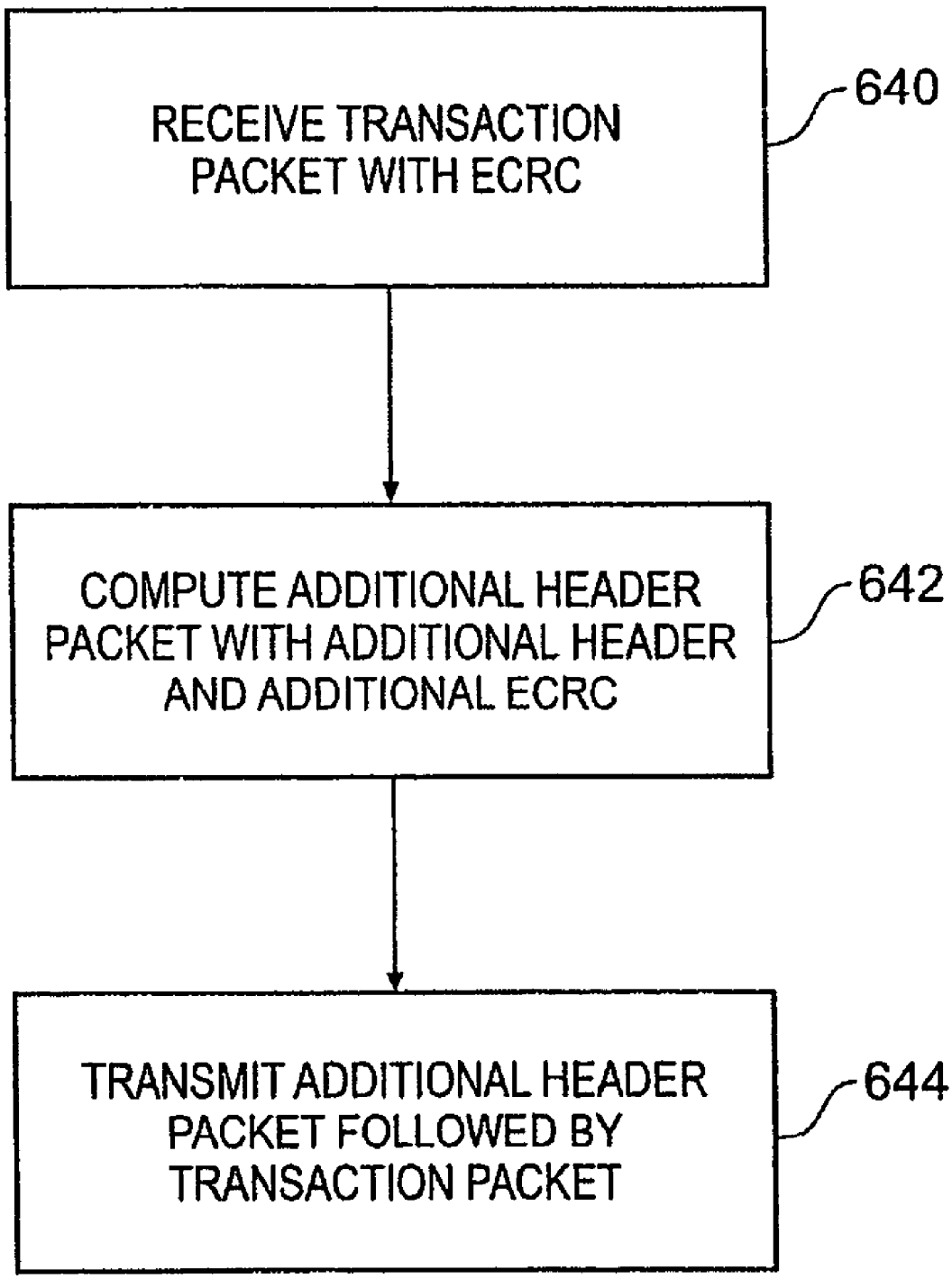
FIG. 20 is a flow diagram illustrating the addition of a verified hierarchy tag.

FIG. 20 is a flow diagram describing the processing of a transaction packet by additional header generator logic 624 of an ingress port 622, by way of example. At 640, a transaction packet with an ECRC is received at the ingress port 622.

At 642, an additional header packet with an additional header and an additional ECRC is generated using, for example, a segment table-based mechanism as described with reference to FIG. 23.

At 644, the additional header packet is transmitted followed by the transaction packet. In the present instance, the transaction packet is arranged to be transmitted immediately after the header packet, whereby subsequent nodes in the hierarchy can be alerted to the arrival of the transaction packet by receipt of an additional header packet.

Figure 21:
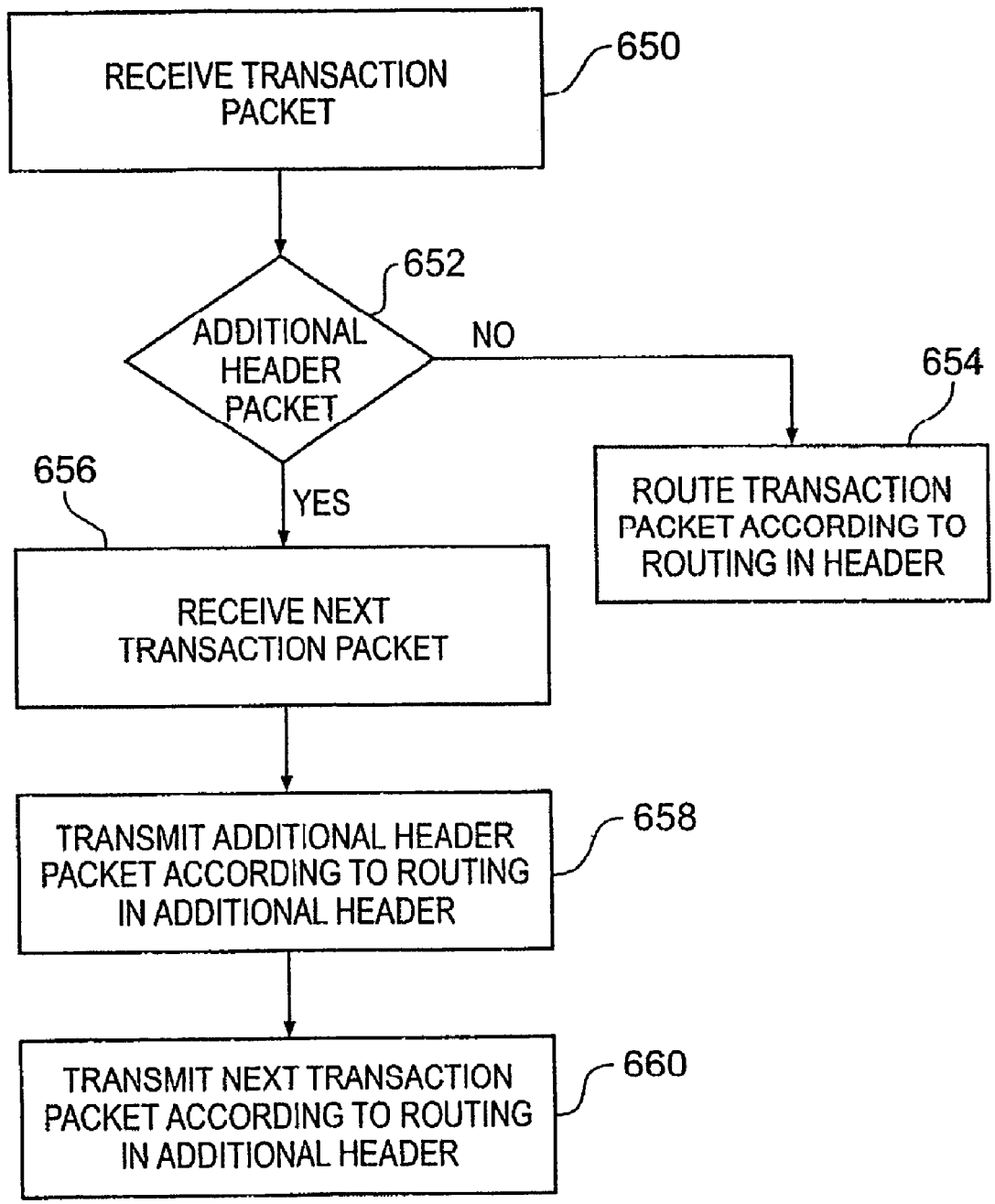
FIG. 21 is a flow diagram illustrating the removal of a verified hierarchy tag.

FIG. 21 is a flow diagram giving an example of the operation of routing logic 628 of an intermediate node 626.

At 650, a transaction packet is received by the routing logic 628.

At 652, if it is detected that the received transaction packet is not an additional header packet, then the received transaction packet is routed in accordance with routing information in the normal header of the transaction packet at 654.

However, if it is determined at 652 that the received transaction packet is in fact an additional header packet, then at 656, the routing logic is operable to recognise the next transaction packet received as a transaction packet relating to the recognised additional header packet. At 658, the additional header packet is routed according to the routing information in the additional header. At 660, the transaction packet received at 656 is then transmitted according to routing in the additional header of the additional header packet, rather than the routing information in the transaction packet received at 656.

In this manner, the additional header packet can be used to control the routing of a transaction packet without having to modify the transaction packet header itself.

The routing logic can additionally be operable to perform conventional routing tasks, including the verification of the integrity of the packets being routed, and in the event that the ECRC for the additional header packet, or the ECRC for the transaction packet are determined to be in error, then to take appropriate remedial action. This can involve, for example, dropping the packet concerned. Alternatively, this can involve forcing a link-level retry with the assumption that the packet was good when being transmitted at the previous stage. In other words, this can involve a link-level retry as if as if a link level (DLLP) integrity check had failed.

Figure 22:
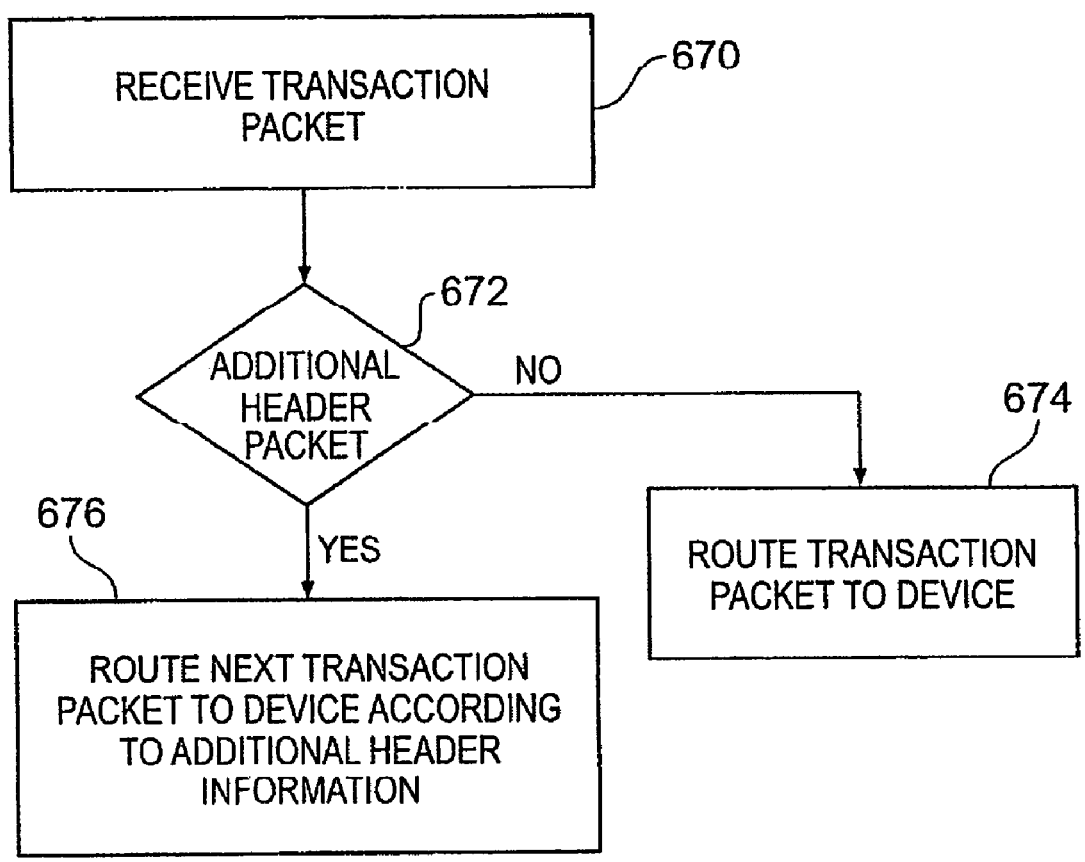
FIG. 22 is a flow diagram illustrating an ECRC check process for a modified transaction packet.

FIG. 22 is a flow diagram illustrating an example of the operation of additional header removal logic 634 of an egress port 632.

At 670, a transaction packet is received. If, at 672, it is determined that the received packet is not an additional header packet, then at 674 the received packet is routed to the device using routing information in the received transaction packet. Alternatively, if it is determined in 672 that the received packet is an additional header packet, then, at 676, the next transaction packet to be received is transmitted to the device in accordance with routing information in the additional header of the additional header packet, rather than the routing information in the header of said next transaction packet.

Once again, the additional header removal logic 634 of the egress port can be operable to provide appropriate verification of the ECRCs of the additional header packet and the transaction packet itself. In the event that the ECRC does not validate, then the additional header removal logic 634 can be operable to take appropriate remedial action. This can involve, for example, dropping the packet concerned. Alternatively, this can involve forcing a link-level retry with the assumption that the packet was good when being transmitted at the previous stage. In other words, this can involve a link-level retry as if as if a link level (DLLP) integrity check had failed.

Figure 23:
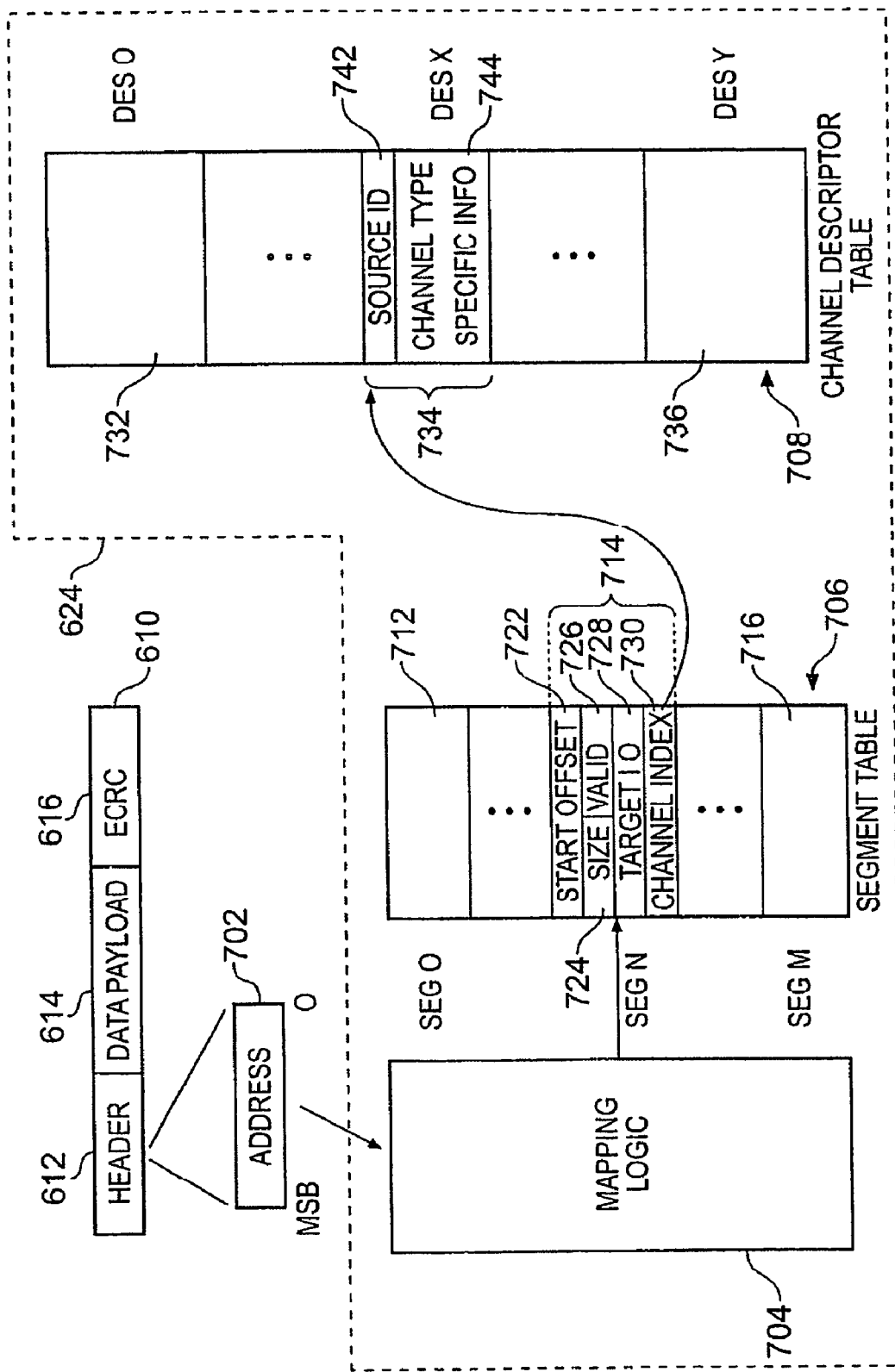
FIG. 23 is schematic representation of a mechanism providing address mapping.

FIG. 23 illustrates, in more detail, an example of logic 624 provided in the ingress port 622. It should be appreciated that similar logic can also be provided at other ports in the infrastructure.

As represented in FIG. 23, the logic 624 includes mapping logic 704 which is responsive to receipt of a transaction packet 610 to extract an address 702 from the header portion 612 of the packet 610. The mapping logic 704 is operable to use one or more of the most significant bits of the address 702 to access a segment table 706. The most significant bits from the address 702 identify a particular segment (e.g., segment N 714) in the segment table 706. As represented in FIG. 23, the segment table includes M+1 segments arranged from segment 0 to segment M.

The valid part of a segment is a variable sized entity. That is, the most significant bit(s) used to identify a segment might define segments of many gigabytes. However, by specifying a legal part of a segment as a start offset plus a size (see FIG. 23 and the description below), it is possible to specify a window of, for example a few megabytes or kilobytes) within the total address window that the segment index bits (i.e., the MSB(s)) of the address defines.

The number of address bits that are used for segment indexing can be a configurable parameter decided, for example, at system configuration time. The same applies to the bits within a PCI address that can be used to extract a segment index. For example, if the physical PCI address that a host can generate is limited, for example to 52 bits, then it is not appropriate to specify that the upper 10 bits of a 64 bit address should be used for segment indexing.

In the present instance, the segment entries can be of variable length. In this instance, each of the segment entries in the segment table 706 (e.g., segment entry 714) includes a start offset value 722 and a size indicator 724. The segment table entry N 714 also includes a valid indicator 726. The segment entry N 714 further includes a target I/O indicator 728 corresponding to the index identified by the most significant bits of the address 702, and a channel index 730 defining a channel for the segment concerned.

If an incoming address has bits set that cause it to be mapped by a segment table entry, (i.e., the relevant set of bits matches to a segment table entry), then the rest of the address can be checked against start offset and size fields within the segment table entry. If the operation involves an address that is not within a valid area (e.g., an area defined between base+offset and base+offset+size−1) then the operation may not be forwarded and an illegal address type error can be signalled. In other words, a transaction can be forwarded if the indexed segment entry is marked as valid and the offset that the address defines is within a legal range defined by the segment entry.

The channel index 730 identifies a channel descriptor. In the present instance, the segment entries identify respective entries in a channel descriptor table. For example, the segment entry N, 714, identifies a channel descriptor X 734.

The channel descriptors can also be of variable size, this being a function of channel type. In the present instance a single table of maximum sized channel descriptors is provided. Alternatively, a degree of indirection could be provided, for example access to variable length channel descriptors could be provided via a pointer array. As another alternative, a set of different channel descriptor tables for different channel types combined with a type indicator in the segment table.

Each of the entries 732, 734, 736 in the channel descriptor table 708 can be pointed to by 0, 1, or more of the entries 712, 714, 716 in the segment table 706. In other words, 0, 1, or multiple sets of most significant bits from the address 702 can correspond to a particular channel descriptor entry 732, 734, 736.

The channel descriptor entries include a source ID 742 and additional channel type specific information 744.

As indicated in FIG. 23, there can be multiple channel descriptor entries, including entry 0, 732, entry X, 734, and entry Y, 736. The information contained in the segment table and the channel descriptor table is used by the mapping logic 704, to control the routing of the transaction packet 610, in the manner described above.

Accordingly, the use of the segment table and channel descriptor table structures shown in FIG. 23 facilitate the routing and address mapping of transaction packet 610 as a function of the root complex to which the transaction belongs. Where a single root complex is shared by multiple independent system images (SIs), the mechanism described in FIG. 23 enables the addition of information to a transaction so that a target device is able to differentiate between different system images within a root complex. A host with support for multiple independent system images will typically be able to control which PCI address can be generated from the individual system images, but may not be able to associate different requester IDs with transactions from the individual system images due to limitations in the hardware implementation of the root complex. The address mapping structure illustrated in FIG. 23 further facilitates the interfacing of different kinds of bridging functions and advanced peer to peer communication across the transaction infrastructure. It facilitates this in being able to add more information to an original packet as a function of both the originator and the target for the transaction and packet.

In the particular instance shown in FIG. 23, the channel descriptor table provides an efficient mechanism for providing a segment table with variable size segments. In other examples, however, the segment table could contain fixed sized segments.

The segments thus define a mapping from an address 702 provided from a root complex in a transaction packet 610 into a target node, and potentially also a new target address.

The segment entry can define a channel number (if not a predefined channel number) and represent an index into an array of channel descriptors. The channel descriptors can contain further information about how to forward the packet as well as additional information for forwarding the additional packet and/or for constructing additional header information. The channel descriptor allows identification of different transport mechanisms as well as various value-add features to utilize a standard packet format (e.g., a standard PCI Express packet format) as well as various enhancements to standard packet formats.

As multiple segments can share the same channel descriptor, the size of the segment table entries can be kept constant even if the channel represents significant additional information. In particular, a channel can be used to add a source ID 742 as well as to access key information and potentially additional or alternative target address information.

Where predefined channel values are used, it is possible to represent a standard forwarding where no additional information is added to the packet, and the requester ID from the original packet can be used as a source ID in an extended header. Also, it is possible to define a mapping where the address is simply passed on, and where the target ID is interpreted as a local switch port to which the packet should be forwarded. This can enable a conventional hierarchical address-based routing scheme, but where each root complex has its own set of routing tables.

The mechanism described with reference to FIG. 23 can thus provide a mechanism that allows a PCI Express switch port to compensate for a lack of functionality in an existing device and/or root complex implementation in a flexible and extendable manner.

The shared PCI Express infrastructure described in the present document provides a solution for sharing PCI Express-based I/O devices via direct client node access to selected device control registers or via higher level I/O requests to a proxy node that performs device control operations to implement the desired I/O operations. In both cases, data can be transferred directly between the device and the memory of the client nodes without any need to perform intermediate buffering in memory.

It would also be desirable to be able to provide a PCI Express-based I/O system that can provide I/O services across an InfiniBand fabric (or other remote direct memory access (RDMA) based fabric) without having to go via any intermediate memory-based buffering scheme. A full definition of the InfiniBand™ Architecture may be found in the InfiniBand™ Architecture Specification Volumes 1 and 2, available from the InfiniBand™ Trade Association.

In order to provide I/O services across an InfiniBand fabric without having to go via any intermediate memory-based buffering scheme, a bridging function is needed that can take PCI Express DMA operations and translate them into InfiniBand remote direct memory access RDMA operations.

In the following, a bridging function is described which is provided as a simple extension to a conventional PCI Express-based InfiniBand host channel adaptor (HCA) in order to allow combinations of shared-HCA functionality and "cut-through" I/O bridging without any significant cost in terms of address mapping and buffering capacity in the HCA implementation. HCA work queue handling for RDMA is outlined in the "InfiniBand™ Architecture Specification Volume 1 Release 1.1—Section 10.8—Work Request Processing Model".

A conventional DMA operation on a PCI Express infrastructure is defined by a combination of a source node, a 64 bit address, a payload size and the payload data. The payload data forms the payload from a target node to a source node in the case of a read operation and vice versa in the case of a write operation.

In the example to be described in the following, a mapping function is used within each ingress port to translate a 64 bit PCI Express address into another PCI Express 64 bit address as well as a PCI Express target node ID.

On InfiniBand, the same information is required, but in addition a queue pair (QP) number for the connection on which a RDMA operation is to be performed must be known, and a resource key (R_Key) value that is to be used to choose a target address space and determine access privileges for the 64 bit virtual address must be specified.

During conventional HCA operations, work requests (work queue elements—WQEs) are delivered to the HCA via a doorbell page that is associated with a specific QP. The WQEs are typically stored as a list of descriptors in memory, and with a payload either within the descriptor itself or the descriptor contains a list of one or more data segment descriptions. Although the InfiniBand specification does not define a specific implementation of work request processing involving doorbell operations, the use of a doorbell page is a commonly applied approach for implementing user-level access to a DMA engine on an IO device.

An overview of an example of HCA doorbell request handling is set out in the following paragraphs.

In an initial setup phase, an operating system (OS) of a host configures a host channel adapter (HCA) with a number of queue pairs (QPs)/channels and ensures that the doorbell PCI address area for the HCA is indexed with the correct page size. Each doorbell page can be arranged to have a fixed association with a specific QP number. Each QP number can be associated with a descriptor that defines if the QP is valid as well as all information required to implement connections to remote QPs as well as an association with local "protection domains" that define the credentials of the QP in terms of accessing local memory. Whenever a QP is set up for use by a user process, the corresponding descriptor can be initialized, and the user process can then be granted access to the corresponding doorbell page by having a virtual address page set up to map the corresponding physical address. When connections are established, additional QP descriptor information/state can be provided by the OS. Processes on different nodes can perform memory registrations that cause address translation mechanisms to be set up so that the HCA can access the memory within a specific protection domain. In other words, memory registered within a specific protection domain can be accessed by all HCA QP contexts that are associated with the same protection domain. Individual memory registrations can be associated with a "key" value that must be provided in order to have the HCA perform access to the memory. In order to enable data transfer using RDMA (Remote Direct Memory Access), between local memory and memory owned by a remote process, the two parties can set up a QP connection and register the relevant (local) memory on each side.

At run-time, after the set up process is complete, the following steps represent an example of run-time operations that can be performed.

A user process constructs a work queue element (WQE) that contains information about operation (read/write), size, plus local and remote addresses and associated "key" values.

The user-process stores a pointer to this WQE in the doorbell address associated with the QP that is supposed to implement the transfer.

The HCA receives the stored data (i.e. the WQE pointer) on PCI.

The HCA determines the QP number as a function of the PCI address.

The HCA verifies that the relevant QP context state allows for data transfers to take place.

The HCA stores the received WQE pointer in a queue associated with the QP.

If the HCA is not currently engaged in another transfer (for the same or another QP), it will fetch the WQE from memory and start performing the data transfer.

If the HCA is currently busy, it performs the data transfer when this QP is scheduled, and the per-QP work queue has reached this WQE. (A HCA will typically "time-slice" between QPs and make sure that all QPs makes progress independently of the data-transfer size associated with any single WQE for any single QP.)

The HCA verifies that the involved local addresses/keys represent legal registered memory for the relevant QP. (The remote HCA/QP performs similar verification before accessing any memory on its side.)

There has thus been explained an overview of an example of HCA doorbell request handling.

To implement the bridging function, a PCI Express fabric port address mapping function and a HCA doorbell and transaction management function is provided in a manner operable to implement the required PCI Express/InfiniBand bridging function in an efficient and scalable manner.

In particular, the PCI Express address mapping function can employ the channel number 730 provided in the segment table entries in the segment table 706 of FIG. 23. As indicated in FIG. 23, the channel number indexes into an array of descriptors referred to as channel descriptors. As also mentioned in the introduction to FIG. 23, the segment table lookup mechanism can be provided in other potential ingress ports, for example, a port connected to a device.

The channel descriptors may be of different types, but in the case of DMA operations, the type of channel descriptor is described as an InfiniBand bridge channel descriptor and the channel type specific information 744 comprises the resource key value and a HCA doorbell address.

An ingress point in the infrastructure, which in the case of a DMA operation can be the port connected to the device providing the DMA operation, can be operable to encapsulate a PCI request received from the device and to map the 64 bit memory address in accordance with the segment entry mapping in a segment table mechanism 624 as shown in FIG. 23. In this case the segment table mechanism 624 is provided at the ingress port connected to the device, for example the port 632' shown in FIG. 24.

Figure 24:
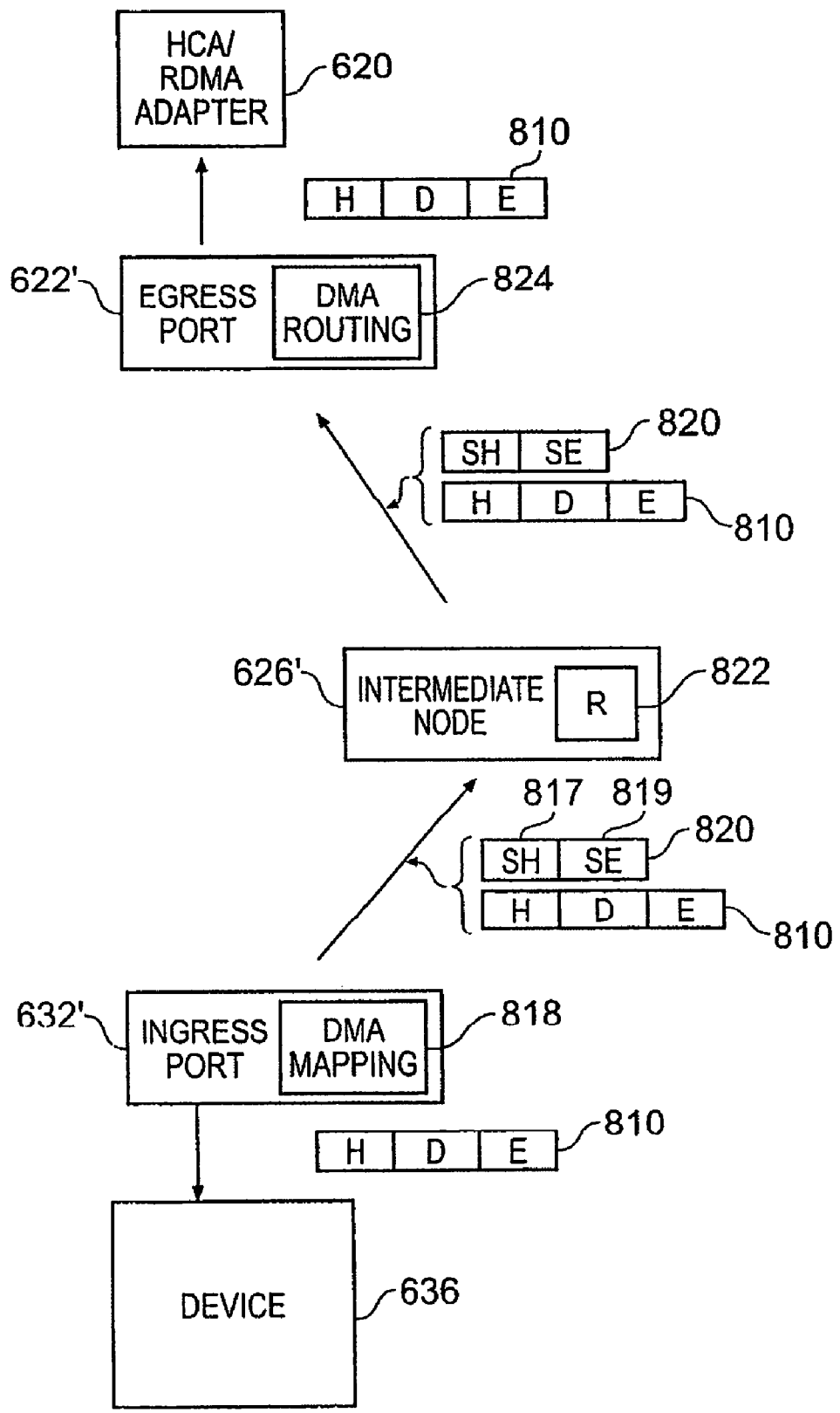
FIG. 24 is a schematic diagram illustrating the passage of a DMA request via an infrastructure.

The ingress port concerned encapsulates the request into a meta request that contains the resource key value and forwards this meta request to the specified HCA doorbell address via the switch egress port that the specified target node ID represents, for example the 622' represented in FIG. 24.

FIG. 24 represents an example of the passing of a DMA request from a device 636 to an RDMA adapter of a host channel adapter (HCA) 620. The DMA request is provided as a transaction packet 810 (that includes a header portion H, a data portion D and an ECRC portion E), from the device to an ingress port 632'. It will be appreciated that the port 632' corresponds to the egress port 632 of FIG. 19, but in the case of a DMA request, the function of port 632 is as an ingress port, rather than an egress port as shown in FIG. 19, hence the reference to ingress port 632'.

The ingress port 632' includes DMA mapping logic 818, which includes a table lookup mechanism as shown in FIG. 23 and is operable to encapsulate the received PCI request 810 in a meta request formed by a supplemental header packet 820 that includes a supplemental header 817 and a supplemental ECRC 819. The supplemental header packet 820 could be called an additional header packet and have an additional header and additional ECRC. However, for reasons of clarity, reference is made herein to a supplemental header packet 820, supplemental header 817 and supplemental ECRC 819 to distinguish the header packet for the case of DMA in FIG. 25 from the additional header packet described with reference to FIG. 19.

The DMA mapping logic 818 is operable to generate the supplemental header packet 820 using a segment table lookup mechanism equivalent to that shown in FIG. 23. In particular, the DMA mapping logic 818 is operable to use a predetermined number of one or more of the most significant bits in the 64 bit address provided in the header (H) of the DMA request 810 to access an appropriate segment in the segment table 706. The appropriate segment in the segment table 706 in turn identifies a corresponding entry in the channel descriptor table in which is contained the resource key value and the HCA doorbell address. In the example shown in FIG. 24, the DMA mapping logic 818 is operable to transmit a supplementary header packet 820 immediately preceding the DMA request packet 810.

The intermediate node 626', which corresponds to the intermediate node 626 of FIG. 19, includes routing logic 822 that is operable to detect the receipt of a supplementary header packet 820 and, in response thereto, to recognize that the next packet to be received is the DMA packet 810. The routing logic 822 of the intermediate node 626' is operable to route the supplementary header packet 820 and the immediately following DMA request packet 810 according to the routing information provided in the supplementary header 817 of the supplementary header packet 820. On receipt at an egress port 622' which corresponds to the ingress port 622 of FIG. 19, DMA routing logic 824 is operable to route the DMA request packet 810 to the appropriate HCA doorbell address as specified in the supplementary header of the supplementary header packet 820.

In the particular example shown in FIG. 24, the combination of the supplementary header packet 820 and the DMA request packet 810 form a meta request. In other examples, the meta request could be formatted by means of a single packet which includes the DMA data payload and a reconfigured header packet.

FIG. 25 is a schematic representation of the PCI Express space for a host channel adaptor as employed in the example of FIG. 24. The PCI Express space 830 includes a protected region 832, and a plurality of doorbell addresses 834, 836 ... 842. Each doorbell address area 0, 1, 2, 3, ... N is one host page in size. The doorbell areas 0, 1, 2, 3, ... N (834, 836, 838, 840 ... 842) define the QP contexts. The respective work queue elements formed by respective DMA requests 810 are stored as individual work queue elements 850 in respective work queue element queues such as the queues 844 and 846 associated with the doorbell area 0 834 and doorbell area 1 836, respectively.

Returning to FIG. 24, each meta request received at the egress port 622' is converted into a single RDMA message (single packet messages). Conventional PCI Express packet flow control mechanisms can ensure that the host channel adaptor is not overloaded. In the case of posted write operations, the transaction is completed from the PCI Express perspective once a write request containing the payload has been accepted by the host channel adaptor. In the case of reads, the host channel adaptor supports multiple outstanding read operations, and keeps track of the PCI Express transaction information so that a PCI Express read response containing the received payload can be generated instead of generating a PCI Express write request in order to store the data in host memory.

In this manner, the mapping function of a PCI Express switch port can be combined with the enhanced doorbell/QP context handling of the host channel adaptor. Since many switch ports and switches can utilize a single host channel adaptor instance, the scaling and bridging functionality can be achieved without depending on a host channel adaptor resident address mapping function. Further, scaling in terms of support for multiple address spaces can be achieved since each switch ingress port represents an individual virtual 64 bit PCI Express address space, and this approach allows all such virtual address spaces to be forwarded via a single host channel adaptor. If the host channel adaptor had contained the address mapping function from a single PCI Express 64 bit address space, then further co-ordination of address range usage would need to be enforced among the different clients.

The described solution can be used in an example where a proxy node performs device control as part of the PCI Express I/O complex. Such a proxy node can then communicate with client nodes on either the same PCI Express fabric or with remote InfiniBand nodes. However, it is also possible to extend this approach to allow direct PCI Express device control across the InfiniBand fabric. In this case, the host channel adaptor could generate read and write requests on the PCI Express side as a result of incoming requests via different QPs and the PCI Express fabric would forward these requests to appropriate device nodes using the same address mapping functions as used for host to device or device to host operations on the shared PCI fabric.

There has thus been provided a mechanism that combines the address mapping resources of a set of shared infrastructure PCI Express switches with the doorbell mechanism and QP context information of an InfiniBand host channel adaptor in order to provide a bridging function that does not depend on store and forward schemes and that handles multiple PCI Express address spaces simultaneously without adding content size to the host channel adaptor implementation. A mechanism can be provided for cut-through bridging between DMA operations on a shared PCI Express infrastructure and RDMA operations on a cluster fabric. Although, in the above description, reference is made to a cluster fabric based on InfiniBand, the described mechanism is also applicable to be implemented on other RDMA-based interconnects.

The described mechanism makes use of the fact that an RDMA fabric adaptor is based on being able to handle multiple concurrent transfers that are indicated for multiple independent clients by dedicated doorbell command addresses. Hence the host channel adaptor contains the required logic to handle multiple transaction contexts for multiple independent transactions.

The mechanism also takes account of the virtualized PCI Express switching infrastructure described herein, and the address mapping mechanism described with reference to FIG. 23.

The mechanism described with reference to FIG. 24 provides a distributed bridging solution where a switch can perform address mapping but does not have to deal with the complexities of RDMA and connection protocols and where a host channel adaptor can handle RDMA operations based on cut-through doorbell operations. All of the bridging logic required can be built into a single device, for example the ingress port of a switch.

By allowing cut-through operations between a shared I/O device and a shared host channel adaptor, it is possible to implement I/O services as logical domains (special system images) on hosts that are also used for other purposes while minimizing conflicts for I/O and memory bandwidth capacity. Only low bandwidth control messages are exchanged between the I/O service system image and other hosts, leaving the bulk of local memory and I/O bandwidth available for use by functions that are local to the host.

In the described example, a PCI Express based RDMA adapter, for example an InfiniBand HCA, can be attached to a shared infrastructure point. The RDMA adapter can be operable to receive a meta request at a doorbell address corresponding to an RDMA connection (QP in InfiniBand). Where the meta request contains a DMA write operation, the RDMA adapter can be operable to construct a single packet RDMA write message on the corresponding QP/RDMA connection using resource key and address as well as data from the received meta request. Where the meta request contains a DMA read operation, the RDMA adapter is operable to construct a single packet RDMA read request and to associate PCI transaction information with the RDMA read context. The RDMA adapter can be operable to perform a DMA read response with correct transaction info from a QP context when receiving an RDMA read response on a QP that where the RDMA read context indicates that this RDMA read was initiated based on a meta request.

There has been described a method and apparatus for routing direct memory access requests via a shared infrastructure. An infrastructure element can receive a first DMA request that comprises a first address and data. The first address can be mapped to a resource key value and a doorbell address for the DMA request and the first DMA request can be encapsulated in a meta request that comprises the resource key value and the doorbell address. The meta request can then be transmitted via the infrastructure using the doorbell address.

There has also been described a method and apparatus providing an RDMA adapter connectable to an infrastructure egress point. A meta request comprising a first DMA request, which comprises a first address and data, a resource key value and a doorbell address, can be received at the doorbell address. An RDMA request message can then be generated using the resource key, the first address and the data from the received meta request.

An infrastructure element can thus receive a first DMA request including a first address and the data, generate a meta request that comprises a resource key value and a doorbell address, and transmit the meta request via the infrastructure using the doorbell address. A remote DMA adapter can then receive the meta request at the doorbell address and generate a RDMA message using the resource key, the first address and the data from the received meta request.

There has been described a computer system comprising a plurality of hosts operable to share device resources, wherein a master host, which owns a device tree, is operable to act as a proxy to at least one client host, which does not own the device tree, by providing IO services to the at least one client host. A client host that cannot directly access the device can thereby gain access to the device by using the IO services provided by the master host. In a particular example system, a device can directly access the memory of a client host.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A system supporting device sharing between hosts via a bus fabric, the system comprising:
    a master host configured to own a device tree including at least one device that is not by itself configured to be shared and to provide I/O services to at least one client host for accessing the device, the at least one client host comprising generic device drivers and subscribing to the I/O services provided by the master host to access the device;
    wherein the client host subscribes to the I/O services provided by the master host by means of virtual I/O request; and
    wherein the master host translates virtual I/O requests into I/O requests to devices by indexing the upper address bits in a virtual address into a routing table.

2. The system of claim 1, providing aggregation of multiple independent devices.

3. The system of claim 1, wherein a DMA engine is operable to supply device data directly to the requesting client host.

4. The system of claim 3, wherein the supply of the device data is directed using selected bits of a virtual address.

5. The system of claim 1 comprising an interconnect apparatus comprising a first plurality of ports configurable as upstream ports, each connectable to a respective host, and at least one port configurable as a downstream port connectable to a device.

6. The system of claim 5, wherein the downstream port is linked to at least one upstream port via a virtual bus fabric.

7. The system of claim 5, wherein the interconnect apparatus provides an interprocessor communication channel between hosts.

8. The system of claim 5, wherein the interconnect apparatus comprises at least one switch.

9. The system of claim 1, wherein the bus fabric supports PCI Express.

10. A method of supporting device sharing between hosts via a bus fabric, the method comprising a master host owning a device tree including at least one device which is not by itself configured to be shared, and providing I/O services to at least one client host for accessing the device, the client host comprising generic device drivers and subscribing to I/O services provided by the master host;
    wherein the client host is subscribes to the I/O services provided by the master host by means of virtual I/O request; and
    wherein the master host translates virtual I/O requests into I/O requests to devices by indexing the upper address bits in a virtual address into a routing table.

11. The method of claim 10, wherein the bus fabric supports PCI Express.

12. A computer system comprising a plurality of hosts operable to share device resources, wherein a master host, which owns a device tree including at least one device which is not by itself configured to be shared, is configured act as a proxy to at least one client host, which does not own the device tree, by providing I/O services to the at least one client host for accessing the device;
    wherein the client host is operable to subscribe to the I/O services provided by the master host by means of virtual I/O request; and
    wherein the master host translates virtual I/O requests into I/O requests to devices by indexing the upper address bits in a virtual address into a routing table.

* * * * *